(12) United States Patent
Ito et al.

(10) Patent No.: US 8,325,987 B2
(45) Date of Patent: Dec. 4, 2012

(54) AMORPHOUS ALLOY MEMBER AND ITS APPLICATION FOR AUTHENTICITY DETERMINING DEVICE AND METHOD, AND PROCESS FOR MANUFACTURING AMORPHOUS ALLOY MEMBER

(75) Inventors: Kensuke Ito, Kanagawa (JP); Takashi Nagayasu, Tokyo (JP); Tomonari Sugata, Toyama (JP); Tadashi Shimizu, Kanagawa (JP); Tetsuya Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1387 days.

(21) Appl. No.: 11/790,625

(22) Filed: Apr. 26, 2007

(65) Prior Publication Data

US 2008/0081213 A1 Apr. 3, 2008

(30) Foreign Application Priority Data

Sep. 28, 2006 (JP) ................................ 2006-265612

(51) Int. Cl.
G06K 9/00 (2006.01)
(52) U.S. Cl. ........................................ 382/106; 340/5.8
(58) Field of Classification Search .................. 382/100, 382/106, 224; 340/5.1, 5.8, 5.86; 356/71
See application file for complete search history.

(56) References Cited

U.S. PATENT DOCUMENTS

| | | | | |
|---|---|---|---|---|
| 3,412,493 A | | 11/1968 | French | ............................. 40/2.2 |
| 5,243,405 A | * | 9/1993 | Tichenor et al. | ............... 356/371 |
| 5,325,167 A | * | 6/1994 | Melen | ............................... 356/71 |
| 5,503,904 A | | 4/1996 | Yoshinaga et al. | ............ 428/195 |
| 5,521,984 A | * | 5/1996 | Denenberg et al. | ........... 382/209 |
| 6,530,998 B1 | | 3/2003 | Oofune | .......................... 148/238 |
| 2001/0052374 A1 | | 12/2001 | Onuki et al. | ................... 148/403 |
| 2004/0112475 A1 | | 6/2004 | Inoue et al. | .................... 148/403 |
| 2007/0107467 A1 | | 5/2007 | Miwa et al. | ................... 65/30.13 |
| 2007/0165208 A1 | * | 7/2007 | Cowburn et al. | ................ 356/71 |
| 2009/0078342 A1 | | 3/2009 | Inoue et al. | .................... 148/501 |

FOREIGN PATENT DOCUMENTS

| | | |
|---|---|---|
| CN | 1456401 A | 11/2003 |
| EP | 0 927 749 A1 | 7/1999 |
| GB | 2 221 870 A | 2/1990 |
| JP | A 06-210987 A | 8/1994 |
| JP | A 06-287895 A | 10/1994 |
| JP | A 07-166498 A | 6/1995 |
| JP | A 08-120598 A | 5/1996 |
| JP | A 10-219597 A | 8/1998 |

(Continued)

OTHER PUBLICATIONS

Inoue et al; "Recent progress in bulk glassy, nanoquasicrystalline and nanocrystalline alloys;" Materials Science and Engineering A; vol. 375-377; pp. 16-30; 2004.

(Continued)

*Primary Examiner* — Andrew W Johns
(74) *Attorney, Agent, or Firm* — Oliff & Berridge, PLC

(57) ABSTRACT

An amorphous alloy member including an irregular region having a center line average roughness Ra of about 0.1 μm to about 1000 μm on a surface, at least the irregular region including an amorphous alloy having an amorphous phase at a volume ratio of about 50% to about 100%. A process for manufacturing the amorphous alloy member, and an authenticity determination device and an authenticity determination method using the amorphous alloy member.

10 Claims, 17 Drawing Sheets

FOREIGN PATENT DOCUMENTS

| | | |
|---|---|---|
| JP | A 10-269333 A | 10/1998 |
| JP | A-11-226696 | 8/1999 |
| JP | A 2001-140047 A | 5/2001 |
| JP | A-2001-246451 | 9/2001 |
| JP | A 2002-083274 A | 3/2002 |
| JP | A 2002-146254 A | 5/2002 |
| JP | A-2002-256401 | 9/2002 |
| JP | A-2005-10581 | 1/2005 |
| JP | A-2005-88075 | 4/2005 |
| JP | A-2005-120473 | 5/2005 |
| WO | WO 93/04538 A1 | 3/1993 |
| WO | WO 2004/016197 A1 | 2/2004 |
| WO | WO 2004/030848 A1 | 4/2004 |

OTHER PUBLICATIONS

Li et al., "Wear Resistance of Co-Base Amorphous Alloys," *Materials Science Progress*, vol. 5, No. 3, Jun. 1991, pp. 185-190, China Academic Journal Electronic Publishing House.

Office Action in Chinese Patent Application No. 200710103823.7, dated Aug. 4, 2010 (with English translation).

Jul. 5, 2011 Japanese Office Action issued in Japanese Patent Application No. 2006-265612 (with translation).

* cited by examiner

64 × 64DOT (LENGTH AND WIDTH 4mm)

32 × 32DOT (LENGTH AND WIDTH 2mm)

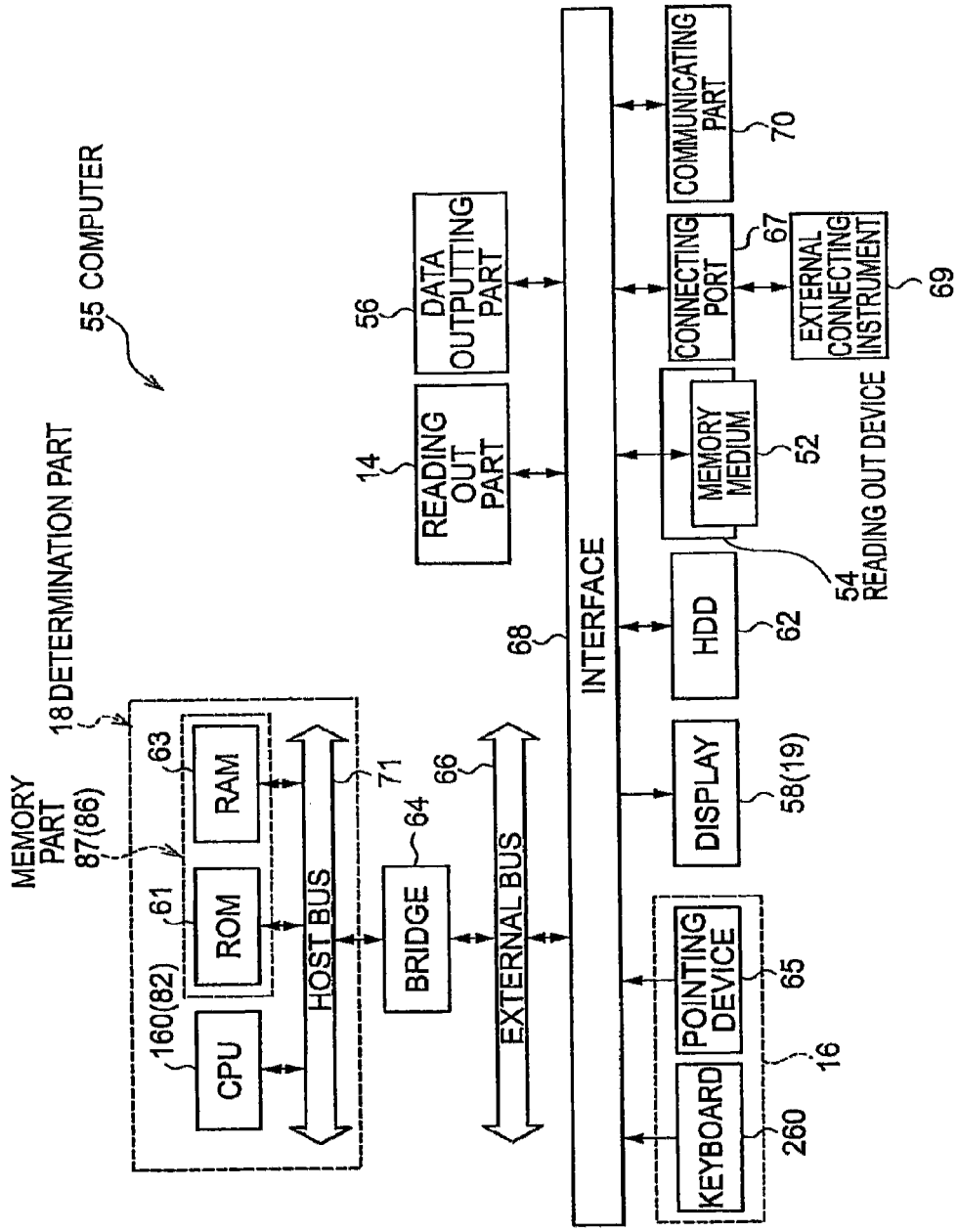

US 8,325,987 B2

AMORPHOUS ALLOY MEMBER AND ITS APPLICATION FOR AUTHENTICITY DETERMINING DEVICE AND METHOD, AND PROCESS FOR MANUFACTURING AMORPHOUS ALLOY MEMBER

CROSS-REFERENCE TO RELATED APPLICATIONS

This application is based on and claims priority under 35 USC 119 from Japanese Patent Application No. 2006-025612 filed Sep. 28, 2006.

BACKGROUND

1. Technical Field

The invention relates to an amorphous alloy member, an authenticity determining device, an authenticity determination method, and a process for manufacturing an amorphous alloy member, and in particular, relates to an amorphous alloy member that may be applied to determination of authenticity, a process for manufacturing the amorphous alloy member, and an authenticity determining device and an authenticity determination method using the amorphous alloy member.

2. Related Art

As the technique for preventing forgery of paper documents such as securities, various title deeds, insurance policies, certificates of residence, birth certificates, written guarantees, passports, bank notes, confidential documents and the like, and ID cards and the like, methods are known of using, together with printing of an identification symbol, high level printing techniques or special inks with restricted availability, in order to make forgery difficult in printing this identification symbol.

When determining authenticity of a medium on which a pattern is formed, generally, authenticity is determined by storing in advance information denoting characteristic of a pattern formed on each medium, reading out information of pattern characteristic on a medium for which authenticity is to be determined, and determining whether characteristic information consistent with the read out result is present in characteristic information stored in advance for each medium, but there is a problem that the authenticity determining ability is reduced by a change in a pattern due to abrasion of each medium.

In addition, in the aforementioned authenticity determining method, it is necessary that a manufacturer or a medium supplier read and store information specific to each medium for every media in advance and, even when a system for not identifying individual medium, but simply for determining authenticity of each medium is constructed, it is still necessary for the manufacturing side or the medium supplier side to retain specific information in advance according to the number of each medium to be distributed.

SUMMARY

According to an aspect of the invention, there is provided an amorphous alloy member comprising an irregular region having a center line average roughness Ra of about 0.1 μm to about 1000 μm on a surface, at least the irregular region comprising an amorphous alloy having an amorphous phase at a volume ratio of about 50% to about 100%.

BRIEF DESCRIPTION OF THE DRAWINGS

Exemplary embodiments of the present invention will be described in detail based on the following:

FIG. 3A shows an atomic arrangement model of a crystalline alloy, and FIG. 3B is a schematic view showing an atomic arrangement model of an amorphous alloy.

FIG. 17 is a schematic block view showing a construction in a computer which performs authenticity determining process.

DETAILED DESCRIPTION

An exemplary embodiment of the amorphous alloy member of an aspect of the invention will be explained based on the drawings.

Figure 1:
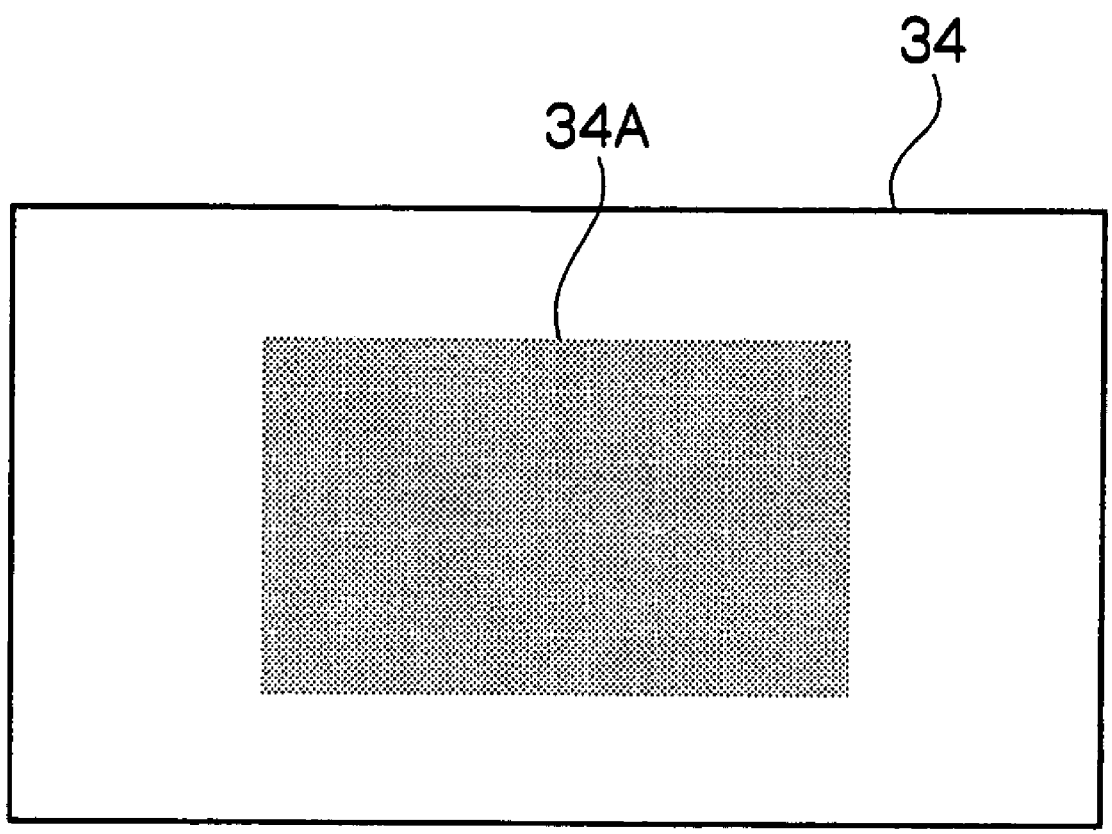
FIG. 1 is a schematic view showing an amorphous alloy member of an exemplary embodiment of an aspect of the invention.

As shown in FIG. 1, on a surface of the amorphous alloy member 34 of the present exemplary embodiment, an irregular region 34A having a center line average roughness Ra of 0.1 μm or more and 1000 μm or less is formed. The "surface of the amorphous alloy member" represents an externally exposed part, irrespective of which surface is at the front or the back in the state in which the amorphous alloy member 34 is used.

This irregular region 34A is a region formed of a fine scale irregular shape, and is a region represented by an irregular pattern derived from a regular or irregular arrangement of indentation portions and protrusion portions. From a viewpoint of forgery prevention of the irregular region 34A, this arrangement of indentation portions and protrusion portions may be irregular.

This irregular region 34A is intentionally formed by a manufacturer by a method of manufacturing an amorphous alloy member, details of which will be described below.

A center line average roughness Ra of the irregular region 34A is 0.1 μm or more and 1000 μm or less, and may be 0.1 μm or more and 100 μm or less.

When a center line average roughness Ra of the irregular region 34A is less than 0.1 μm, since densities of indentation portions and protrusion portions constituting the irregular region 34A become high, and it becomes difficult to take the irregular shape in a normal optical system, it becomes difficult to use this irregular region 34A as a region for authenticity determination described later. On the other hand, when a center line average roughness Ra of an irregular region is more than 1000 μm, the irregular region 34A is easily forged in some cases.

This center line average roughness Ra may be measured by measuring a center line average roughness at a measurement length of 4 to 80 mm and a cut off value of 0.8 to 8 mm prescribed in JIS-B-0601, the disclosure of which is incorporated by reference herein, regarding an irregular region of a surface of an amorphous alloy member using a three-dimensional surface roughness measuring meter (SE-3500, manufactured by Kosaka Laboratory Ltd.) based on the method of the JIS-B-0651, the disclosure of which is incorporated by reference herein.

As described above, the irregular region 34A is a region formed of fine irregularities at a microscopic level, a width of this convex or concave part is very small as a micrometer order, and it is not easy that a user forges this.

At least, an irregular region 34A of this amorphous alloy member 34 contains an amorphous alloy as a substantially amorphous alloy containing at least an amorphous phase having a volume ratio of 50% or more and 100% or less.

The present exemplary embodiment, for simplifying explanation, will be explained provided that an amorphous alloy member 34 is composed of an amorphous alloy as a substantially amorphous alloy containing at least an amorphous phase having a volume ratio of 50% or more and 100% or less, but as described above, it is enough that an amorphous alloy is contained in at least an irregular region 34A.

Herein, the "amorphous phase" means that a phase of forming an alloy is an amorphous single layer. When the amorphous alloy contains an amorphous phase having a volume ratio of less than 50%, it is meant that a crystalline phase is volumetrically larger than an amorphous phase, and since an alloy exhibits properties close to that of a crystalline alloy, there is a problem that excellent properties (e.g. excellent transferring property etc.) in an aspect of the invention possessed by an alloy consisting of an amorphous phase may not be utilized.

In an amorphous alloy, as details will be described later, an amorphous alloy member 34 may be easily manufactured not only by casting from a molten metal, but also by forming due to viscose flow utilizing a glass transition region and, at the same time, excellent transferring property may be exhibited, and a shape and a dimension of a mold used at manufacturing may be extremely faithfully reproduced. For this reason, by performing mold casting or forming using a mold which has been subjected to surface processing corresponding to the irregular region 34A, the surface state of a mold may be faithfully transferred over fine parts, and an amorphous alloy member 34 on which the irregular region 34A is formed may be manufactured (details will be described later).

As an amorphous alloy constituting an amorphous alloy member 34 of the present exemplary embodiment, as described above, any alloy may be used as long as it contains at least an amorphous phase having a volume ratio of 50% or more and 100% or less, and the alloy is not limited to particular materials, but specifically, the alloy may be at least one selected from a Zr-based amorphous alloy, a Hf-based amorphous alloy, a Fe-based amorphous alloy, a Co-based amorphous alloy, a Ni-based amorphous alloy, a Ti-based amorphous alloy, a Cu-based amorphous alloy, an Au-based amorphous alloy, and a La-based amorphous alloy.

Further, as an amorphous alloy constituting the amorphous alloy member 34, an amorphous alloy having at least one composition selected from the following formulae (1) to formula (7) may be used.

$$M_{100-n}TM_n \qquad \text{Formula (1)}$$

In formula (1), M represents one or more elements of Fe, Co, Ni, Cu, Ti, Zr and Hf. TM necessarily contains 1 atomic % or more of at least one element selected from the group consisting of Cr, Mo, Nb, Al, Sn and B, and a remainder represents at least one element selected from the group consisting elements belonging to Group 3, transition metal elements belonging to Group 4, transition metal elements belonging to Group 5, transition metal elements belonging to Group 6, transition metal elements belonging to Group 8, transition metal elements belonging to Group 9, transition metal elements belonging to Group 10 and transition metal elements belonging to Group 11, typical elements belonging to Group 13, typical elements belonging to Group 14, and typical elements belonging to Group 15, but excluding Cr, Mo, Nb, the elements applied in M, Al, Sn and B. And, n represents atomic %, and the relationship $5 \leq n \leq 50$ is satisfied.

$$Cu_p Ti_q M1_{100-p-q} \qquad \text{Formula (2)}$$

In formula (2), M1 represents at least one kind element selected from the group consisting of elements belonging to the iron group, elements belonging to the platinum group, elements belonging to noble metals, Al, Sn, Zn, Hf and Zr. And, p and q each represent atomic %, and the relationships $50 \leq p \leq 65$ and $2 \leq q \leq 20$ are satisfied.

$$Ni_{100-s-t-u}Nb_s(Zr,Hf)_t M2_u \qquad \text{Formula (3)}$$

In formula (3), M2 represents at least one kind element selected from the group consisting of elements belonging to the iron group, elements belonging to the platinum group, elements belonging to noble metals, Cu, and Ti. And, s, t and u each represent atomic %, and the relationships $10 \leq s \leq 25$, $5 \leq t \leq 20$, $5 \leq u \leq 25$, and $10 \leq t+u \leq 35$ are satisfied.

$$Fe_{100-x-y}M3_x M4_y \qquad \text{Formula (4)}$$

In formula (4), M3 represents at least one element selected from the group consisting of transition metal element elements belonging to Group 3, transition metal element elements Group 4, transition metal element elements Group 5 and transition metal element elements Group 6. M4 consists of one or more elements of Mn, Ru, Rh, Pd, Ga, Al, Ge, Si, B and C. And, x and y each represent atomic %, and the relationships $2 \leq x \leq 35$ and $5 \leq y \leq 30$ are satisfied.

$$(Fe_{1-z}(Co,Ni)_z)_{100-x-y}M3_xM4_y \qquad \text{Formula (5)}$$

In the formula (5), M3 represents at least one element selected from the group consisting of transition metal elements belonging to Group 3, transition metal elements Group 4, transition metal elements Group 5 and transition metal elements Group 6. M4 consists of any one or more elements of Mn, Ru, Rh, Pd, Ga, Al, Ge, Si, B and C. And, x, y and z each represent atomic %, the relationships and $2 \leq x \leq 35$, $5 \leq y \leq 30$ and $0.1 \leq z \leq 0.7$ are satisfied.

$$(Zr,Hf)_aM5_bM6_c \qquad \text{Formula (6)}$$

In formula (6), M5 represents at least one element selected from the group consisting of elements belonging to Group 3, elements belonging to Group 5, elements belonging to Group 6, elements belonging to the iron group, elements belonging to the platinum group, elements belonging to noble metals, Cu, Ti and Mn. M6 represents at least one element selected from the group consisting of Be, Zn, Al, Ga, B, C and N. And, a, b, and c each represent atomic %, and the relationships $30 \leq a \leq 70$, $15 \leq b \leq 65$ and $1 \leq c \leq 30$ are satisfied.

$$Ti_{100-i-j-k}Cu_iM7_jM8_k \qquad \text{Formula (7)}$$

In formula (7), M7 represents at least one transition metal element selected from the group consisting of Zr, Hf, elements belonging to the iron group, elements belonging to the platinum group. M8 represents at least one element selected from the group consisting of elements belonging to Group 3, elements belonging to Group 5, elements belonging to Group 6, Al, Sn, Ge, Si, B, and Be. And, i, j and k each represent atomic %, and the relationships $5 \leq i \leq 35$, $10 \leq j \leq 35$ and $1 \leq k \leq 20$ are satisfied.

Among amorphous alloys of formula (1) to formula (7), it is preferable to use the formula (1) and the formula (6) because the amorphous forming ability is high, and a member for determining forgery is easily manufactured.

Further, as an amorphous alloy, an amorphous alloy having a composition represented by any one of the following formula (8) to formula (13) may be suitably used because the amorphous forming ability is high, and better mechanical properties such as a strength, a hardness and the like are provided.

$$M^1_aM^2_bLn_{cc}M^3_dM^4_eM^5_f \qquad \text{Formula (8)}$$

In formula (8), M1 represents one or two elements selected from Zr and Hf, $M^2$ represents at least one element selected from the group consisting of Ni, Cu, Fe, Co, Mn, Nb, Ti, V, Cr, Zn, Al and Ga, Ln represents at least one element selected from the group consisting of Y, La, Ce, Nd, Sm, Gd, Tb, Dy, Ho, Yb and Mm (mischmetal which is a mixture of rare earth elements), $M^3$ represents at least one element selected from the group consisting of Be, B, C, N and O, $M^4$ represents at least one element selected from the group consisting of Ta, W and Mo, and $M^5$ represents at least one element selected from the group consisting of Au, Pt, Pd and Ag. And, a, b, c, d, e and f each are atomic %, and the relationships $25 \leq a \leq 85$, $15 \leq b \leq 75$, $0 \leq c \leq 30$, $0 \leq d \leq 30$, $0 \leq e \leq 15$ and $0 \leq f \leq 15$ are satisfied.

The amorphous alloy represented by formula (8) include amorphous alloys of the following formulas (8-a) to (8-p). In the following formulas (8-a) to (8-p), $M^1$, $M^2$, $M^3$, $M^4$, $M^5$, Ln, a, b, c, d, e and f are as defined in formula (8).

$$M^1_aM^2_b \qquad \text{Formula (8-a)}$$

The amorphous alloy of the formula (8-a) has properties that mixed enthalpy is negative and large, and the amorphous forming ability is better since an $M^2$ element is present with Zr or Hf.

$$M^1_aM^2_bLn_c \qquad \text{Formula (8-b)}$$

Like this amorphous alloy, by adding a rare earth element to an alloy of formula (8-a), amorphous thermal stability is improved.

$$M^1_aM^2_bM^3_d \qquad \text{Formula (8-c)}$$

$$M^1_aM^2_bLn_cM^3_d \qquad \text{Formula (8-d)}$$

Like the amorphous alloys represented by formula (8-c) and formula (8-d), by filling gaps in an amorphous structure with an element $M^3$ (Be, B, C, N, O) having a small atomic radius, the structure is stabilized, and the amorphous forming ability of an amorphous alloy is improved.

$$M^1_aM^2_bM^4_e \qquad \text{Formula (8-e)}$$

$$M^1_aM^2_bLn_cM^4_e \qquad \text{Formula (8-f)}$$

$$M^1_aM^2_bM^3_dM^4_e \qquad \text{Formula (8-g)}$$

$$M^1_aM^2_bLn_cM^3_dM^4_e \qquad \text{Formula (8-h)}$$

Like the amorphous alloys represented by these formulas (8-e) to (8-h), when a high melting point metal $M^4$ (Ta, W, Mo) is added, heat resistance and corrosion resistance are improved without influencing on the amorphous forming ability of an amorphous alloy.

$$M^1_aM^2_bM^5_f \qquad \text{Formula (8-i)}$$

$$M^1_aM^2_bLn_cM^5_f \qquad \text{Formula (8-j)}$$

$$M^1_aM^2_bM^3_dM^5_f \qquad \text{Formula (8-k)}$$

$$M^1_aM^2_bLn_cM^3_dM^5_f \qquad \text{Formula (8-l)}$$

$$M^1_aM^2_bM^4_eM^5_f \qquad \text{Formula (8-m)}$$

$$M^1_aM^2_bLn_cM^4_eM^5_f \qquad \text{Formula (8-n)}$$

$$M^1_aM^2_bM^3_dM^4_eM^5_f \qquad \text{Formula (8-o)}$$

$$M^1_aM^2_bLn_cM^3_dM^4_eM^5_f \qquad \text{Formula (8-p)}$$

These amorphous alloys containing a noble metal $M^5$ (Au, Pt, Pd, Ag) have the properties that they do not become brittle even when crystallization occurs.

$$Al_{100-g-h-i}Ln_gM^6_hM^3_i \qquad \text{Formula (9)}$$

In formula (9), Ln represents at least one element selected from Y, La, Ce, Nd, Sm, Gd, Tb, Dy, Ho, Yb and Mm, $M^6$ represents at least one element selected from the group consisting of Ti, V, Cr, Mn, Fe, Co, Ni, Cu, Zr, Nb, Mo, Hf, Ta and W, $M^3$ represents at least one element selected from the group consisting of Be, B, C, N and O. g, h, and i each represent atomic %, and the relationships $30 \leq g \leq 90$, $0 \leq h \leq 55$ and $0 \leq i \leq 10$ are satisfied.

The above amorphous alloy includes amorphous alloys of the following formulas (9-a) and (9-b). In the following formulas (9-a) and (9-b), Ln, $M^6$, $M^3$, g, h and i are as defined in formula (8).

$$Al_{10-g-h}Ln_gM^6_h \qquad \text{Formula (9-a)}$$

The amorphous alloy of formula (9-a) has mixed enthalpy which is negative and large, and the better amorphous forming ability.

$$Al_{100-g-h-i}Ln_gM^6_hM^3_i \qquad \text{Formula (9-b)}$$

In the amorphous alloy of formula (9-b), by filling gaps in an amorphous structure with an element $M^3$ (Be, B, C, N, O) having a small atomic radius, the structure is stabilized, and the amorphous forming ability is improved.

$$Mg_{100-p}M^7_p \quad \text{Formula (10)}$$

In formula (10), $M^7$ represents at least one element selected from the group consisting of Cu, Ni, Sn, and Zn, p represents atomic %, and the relationship $5 \leq p \leq 60$ is satisfied.

The amorphous alloy of formula (10) has mixed enthalpy which is negative and large, and the better amorphous forming ability.

$$Mg_{100-q-r}M^7_q M^8_r \quad \text{Formula (11)}$$

In formula (11), $M^7$ represents at least one element selected from the group consisting of Cu, Ni, Sn and Zn, and $M^8$ represents at least one selected from the group consisting of Al, Si and Ca. And, q and r each represent atomic %, and the relationships $1 \leq q \leq 35$ and $1 \leq r \leq 25$ are satisfied.

Like the amorphous alloy of formula (11), the structure is stabilized, and the amorphous forming ability is improved by filling gaps in an amorphous structure with an element $M^8$ (Al, Si, Ca) having a small atomic radius in the alloy of formula (10).

$$Mg_{100-q-s}M^7_q M^9_s \quad \text{Formula (12)}$$

$$Mg_{100-q-r-s}M^7_q M^8_r M^9_s \quad \text{Formula (13)}$$

In formula (12) and formula (13), $M^7$ represents at least one element selected from the group consisting of Cu, Ni, Sn and Zn, $M^8$ represents at least one element selected from the group consisting of Al, Si and Ca, and $M^9$ represents at least one element selected from the group consisting of Y, La, Ce, Nd, Sm and Mn. And, q, r and s each represent atomic %, and the relationships $1 \leq q \leq 35$, $1 \leq r \leq 25$ and $3 \leq s \leq 25$ are satisfied.

Like amorphous alloys of formula (12) and formula (13), amorphous thermal stability is improved by adding a rare earth element to alloys of the formulas (10) and (11).

Among the aforementioned amorphous alloys, Zr-TM-Al-based and Hf-TM-Al-based (TM: transition metal) amorphous alloys which have an extremely wide temperature difference between a glass transition temperature (Tg) of an amorphous alloy and a crystallization temperature (Tx) of an amorphous alloy exhibit a high strength and a high corrosion resistance.

Further, in the case of an amorphous alloy having a supercooled liquid temperature region ΔTx (ΔTx=Tx−Tg) of not lower than 30 K, a temperature controlling width has a room, and molding may become easier. Particularly, the Zr-TM-Al-based amorphous alloy has an extremely wide supercooled liquid temperature region ΔTx of not lower than 60 K and, at this supercooling temperature range, very better processability is exhibited even at a low stress of not more than several tens MPa due to viscose flow.

The Zr-TM-Al-based and Hf-TM-Al-based amorphous alloys have a very great range of ΔTx, which may vary depending on an alloy composition and a measuring method. For example, ΔTx of a $Zr_{60}Al_{15}Co_{2.5}Ni_{7.5}Cu_{15}$ alloy (Tg: 652 K, Tx: 768 K) is extremely wide as 116 K.

In addition, generally, for the manufacturing an amorphous alloy, rapid cooling is required, but the aforementioned amorphous alloy having ΔTx of not lower than 30 K may easily afford a bulky material composed of an amorphous single phase from a molten metal at a cooling rate of around 10 K/s, and is very stable and easily manufactured. In addition, its solidified surface is also extremely smooth, and has such transferring property that an even abrasion flaw of a micron order on a mold surface is faithfully reproduced.

Therefore, when such an amorphous alloy having wide ΔTx is used, the surface property of a mold may be reproduced faithfully as it is.

In addition, the Zr-TM-Al-based and Hf-TM-Al-based amorphous alloys have a hardness expressed by a Vickers hardness (Hv) of 460 (DPN) at room temperature to around Tg, a tensile strength of 1,600 MPa, and a bending strength of 3,000 MPa. A thermal expansion rate a is small as $1 \times 10^{-5}/K$ at room temperature to around Tg, a Young modulus is 91 GPa, and an elastic limit at compressing exceeds 4 to 5%. Further more, toughness is high, exhibiting a Charpy impact value of 60 to 70 kJ/m². While such extremely high strength property is exhibited, when those alloys are heated to a glass transition region, a flowing stress is reduced to around 10 MPa.

For this reason, when the Zr-TM-Al-based and Hf-TM-Al-based amorphous alloys are used, processing is easy and, even when an amorphous alloy member constructed of these amorphous alloys is of a low stress, and has a complicated shape, the member may be easily molded.

In addition, generally, when an amorphous alloy is heated to a glass transition region, crystallization begins by retention for a long time, but the aforementioned alloy having wide ΔTx has a stable amorphous phase and, when a temperature within ΔTx is suitably selected, crystallization does not occur for up to about 2 hours, and it is not necessary to concern about crystallization in normal molding processing.

As a material used in the amorphous alloy member 34 to which an aspect of the invention is applied, in addition to the aforementioned amorphous alloys, those conventionally known various amorphous alloys such as amorphous alloys described in JP-A Nos. 10-186176, 10-311923, 11-104281, and 11-189855 may be used.

As a method of manufacturing an amorphous alloy member 34 on which the irregular region 34A is formed, using the aforementioned amorphous alloy, casting technique and forging technique may be used.

Since an amorphous alloy has high precision casting property and processability, and has such an excellent transferring property that a shape of a mold may be faithfully reproduced over fine parts as described above, an objective amorphous alloy member 34 having an irregular region 34A may be manufactured at a better large scale by a single process, using casting technique or forging technique.

One example of a process of manufacturing an amorphous alloy member using casting technique will be specifically explained.

Figure 2A:
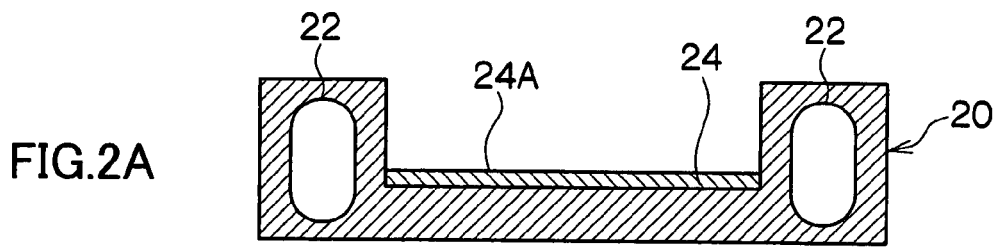
FIGS. 2A to 2E are a schematic view showing a process for manufacturing an amorphous alloy member using the forging technique, of an exemplary embodiment of an aspect of the invention.

As shown in FIG. 2A, a casting mold 20 is prepared. As a material for this casting mold 20, a material having its softening temperature Ts which is a sufficiently higher than a crystallization temperature Tx of an amorphous alloy used as a material for an amorphous alloy member 34 is used. For example, silicon and quartz glass have a melting point of 1000° C. or more, and may be suitably used as a casting mold 20. In FIGS. 2A to 2E, the same symbol denotes the same object.

In the interior of a casting mold 20, a water passageway 22 constituting a cooling device is formed. By passing water through this water passageway 22, an amorphous alloy member formed in a concave part 24 of the casting mold 20 may be cooled.

In manufacturing an amorphous alloy member 34, first, as a template manufacturing step, an irregular-shaped region 24A is formed in at least a part of regions of the concave part 24 of this casting mold 20. By transferring an irregular shape of this irregular-shaped 24A onto the amorphous alloy member 34, the irregular region 34A is formed on the amorphous alloy member 34 (see FIG. 2E).

The irregular-shaped region 24A is a region formed of a fine irregular shape like the irregular region 34A, and is a region represented by an irregular pattern due to sequence of regular or irregular indentation portions and protrusion portions. And, a center line average roughness Ra of the irregular region 34A is 0.1 μm or more and 1000 μm or less, and may be 0.1 μm or more and 100 μm or less.

From a viewpoint of forgery prevention, the irregular-shaped region 24A may be formed on the casting mold 20 by a method which is difficult to be reproduced even when a manufacturer forms this irregular-shaped region 24A under the same environment and the same condition.

A method of forming this irregular-shaped region 24A may be a method by which it is difficult to manufacture the same shape even under the same environment and the same condition as described above and, for example, nicking processing by pressing or the like, cutting processing by a bite, discharge processing, and blast processing using an abrasive particle, on the concave part 24 of the casting mold 20 may be used.

For this reason, a shape and characteristic of each irregular-shaped region 24A become unique to each casting mold 20 on which an irregular-shaped region 24A is formed.

Figure 2B:
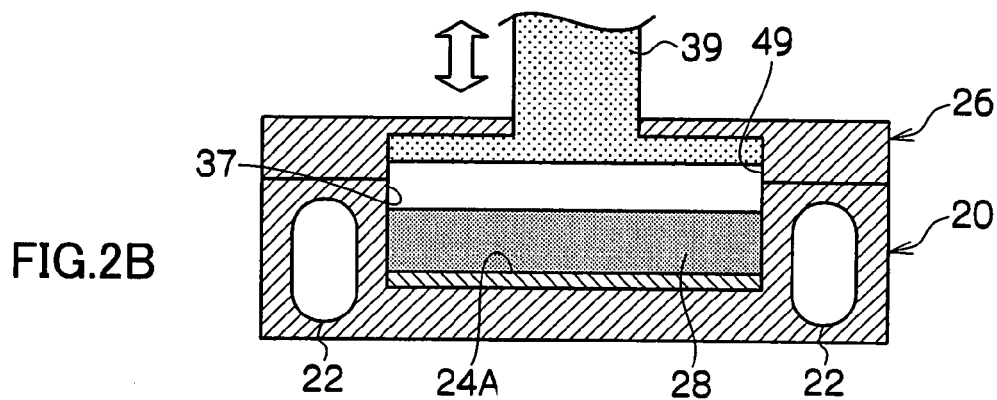

As shown in FIG. 2B), in a second mold 26, a communicating hole 49 as a concave part corresponding to the concave part 24 of the casting mold 20 is provided and, at the same time, a plunger 39 is reciprocally provided for the communication hole 49.

When this casting mold 20 and the second mold 26 are clamped each other, a cavity 37 is constructed.

Then, in a pouring step shown in FIG. 2B, the second mold 26 is overlaid on the casting mold 20 on which an irregular-shaped region 24A is formed, such that the concave 24 of the casting mold and the communicating hole 49 as a concave part of the second mold 26 face each other and, thereafter, the casting mold 20 and the second mold 26 are clamped. And, a molten metal 28 is poured into a cavity 37 composed of the casting mold 20 and the second mold 26.

This molten metal 28 is a molten metal for manufacturing the amorphous alloy, and may be prepared by preparing alloy components such as those represented by the aforementioned formulas, and melting them.

This molten metal 28 is placed into the communicating hole 49 through a runner not shown, which is provided in the second mold 26.

A temperature of the molten metal 28 for an amorphous alloy at this time is not lower than a melting point (Tm) of an amorphous alloy of an amorphous alloy member, and may be not lower than the melting point (Tm)+100° C.

Alternatively, before a molten metal is poured, the molten metal 28 may be subjected to cleaning treatment according to a conventional method. In cleaning treatment, for removing an unnecessary gas such as hydrogen in the molten metal, flux treatment, degassing treatment using an argon gas, a chlorine gas or the like, filtering treatment using a filter with a filtering material such as a rigid media filter such as a ceramic tube filter, and a ceramic foam filter, or alumina flake or alumina ball, or a glass cloth filter, or a combination of degassing treatment and filtering treatment is performed.

These cleaning treatments may be performed in order to prevent a defect due to a foreign matter such as a non-metal intervening matter and oxide in a molten metal, or a defect due to a gas dissolved in a molten metal. Filtering of a molten metal is described in each of JP-A No. 6-57432, 3-162530, 5-140659, 4-231425, 4-276031, 5-311261, and 6-136466. In addition, degassing of a molten metal is described in JP-A Nos. 5-51659, and 5-49148.

Figure 2C:
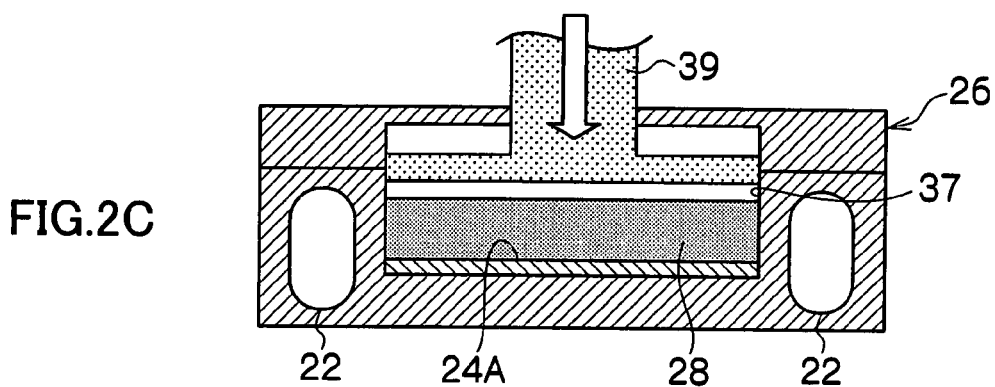

Then, in a hardening step shown in FIG. 2C, for improving transferring property, by moving a plunger 39 towards a direction of concave part 24 of a casting mold 20, a pressure (casting pressure) is applied to a poured molten metal 28. The casting pressure may be a pressure which allows a forgery determining member to be molded and, for example, is several tens MPa. At this time, the peripheral part of a plunger 39 in a direction in which a concave part 24 is situated is stopped at a position not contacting with the molten metal 28. By flowing water through the water passageway 22 in this pressurized state, the molten metal 28 is cooled to be hardened.

It is preferable that the cooling rate is in a range of 300° C./second or more and 10000000° C./second or less. When the rate is less than 300° C./second, many coarse intermetallic compounds are formed in some cases. When the rate is more than 10000000° C./second, though it is theoretically possible to obtain an amorphous alloy, the cooling rate may not be obtained by a general industrial procedure in some cases.

In order to prevent oxidation of a molten metal, it is preferable that a hardening step of FIG. 2C is performed in the inert gas atmosphere such as Ar and He, or in the vacuum atmosphere. The vacuum condition may be at $10^{-1}$ torr or less.

Figure 2D:
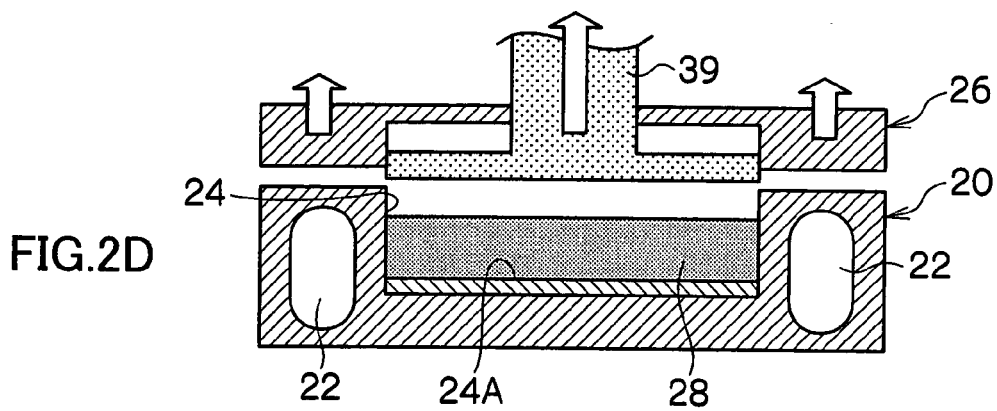
Figure 2E:

Finally, in a separating step shown in FIG. 2D, the casting mold 20 and the second mold 26 are opened while a plunger 39 is moved. Thereby, as shown in FIG. 2E, an amorphous alloy member 34 which is composed of the molten metal 28 which has been hardened by cooling, that is, the amorphous alloy, and in which the irregular-shaped region 24A is transferred to form the irregular region 34A, may be manufactured.

That is, in at least a part of regions of the manufactured amorphous alloy member 34, the irregular region 34A onto which a convex part corresponding to a concave part of the irregular-shaped region 24A formed in the casting mold 20, and a concave part corresponding to a convex part of the irregular-shaped region 24A has been transferred, are formed.

Figure 3B:
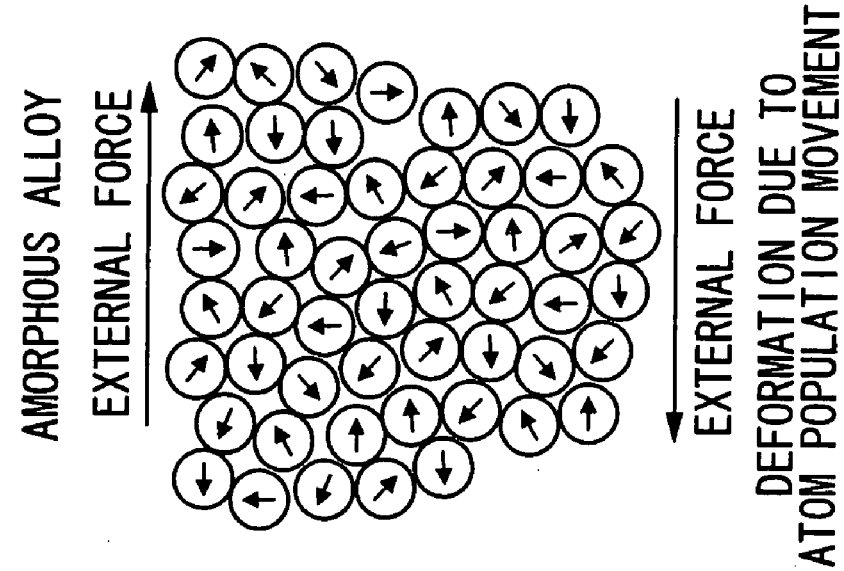
FIGS. 3A and 3B are a schematic view showing an atomic arrangement model.
Figure 3A:
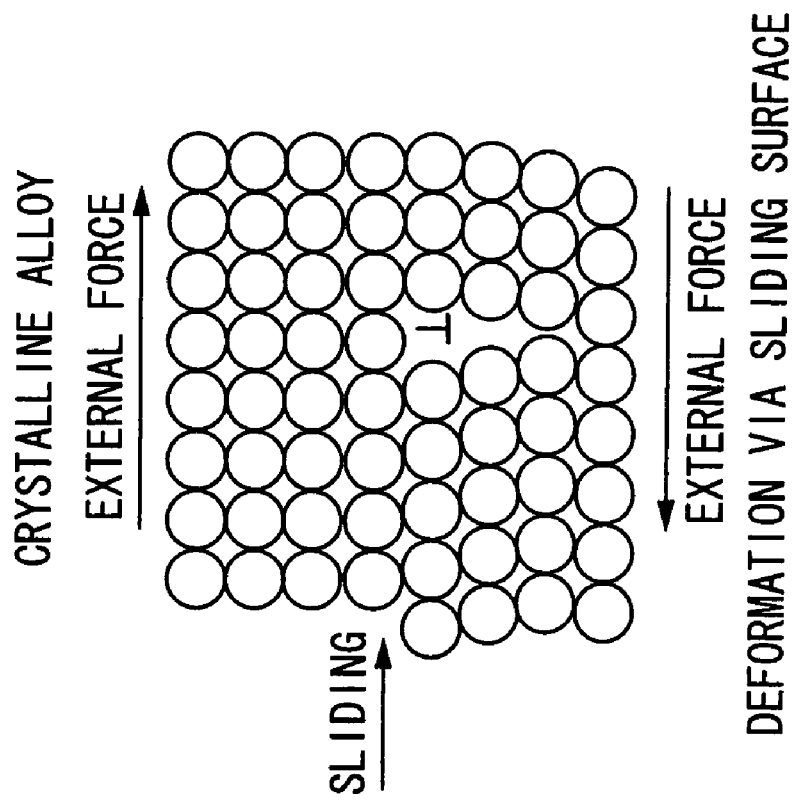

As described above, an amorphous alloy included in amorphous alloy member 34 is a metal, but is a stable amorphism like an oxide glass, and is easily deformed (viscosity-flown) at a high temperature. For this reason, as shown in a cross-sectional model view of a crystalline alloy shown in FIG. 3A, and a cross-sectional model view of an amorphous alloy shown in FIG. 3B, since an amorphous alloy has more random atomic arrangement as compared with a crystalline alloy, it has no particular sliding plane present in a crystalline alloy, has the excellent mechanical strength, and, at the same time, has such a better transferring property that a fine irregular shape of the irregular-shaped region 24A of the casting mold 20 is reproduced better.

For this reason, better durability of the amorphous alloy member 34 having the irregular region 34A may be obtained and, at the same time, the irregular-shaped region 24A of the casting mold 20 may be precisely transferred over fine parts.

In addition, since a supercooled liquid region is present in an amorphous alloy, it is not necessary to consider solidification shrinkage and, since the amorphous alloy is amorphous, a surface becomes smooth. For this reason, the surface state of the irregular-shaped region 24A of the casting mold 20 may be reproduced at a high precision.

In the forgoing, the case where a solid template is used in casting was explained, but a driving template, a typical example of which is a continuous casting method, may be used.

Examples of the continuous casting method include a method using a cooling roll, a typical example of which is a single roll method, a double roll method (Hunter method) and a 3C method, and a method using a cooling belt or a cooling block, a typical example of which is a double belt method (Hasley method), and an ALUSWISS CASTER II TYPE.

Also, in the case where these continuous casting methods are used, by casting like the case where solid casting is used, the amorphous alloy member 34 on which the irregular region 34A is formed may be manufactured.

Next, one example of a method of manufacturing an amorphous alloy member using forging technique will be explained.

As forging technique, a die forging method using a forging mold may be used and, in order to decrease a deformation resistance of a material, any of hot forging in which molding is performed by heating to a high temperature which is not lower than a recrystallization temperature, cold forging in which molding is performed at a normal temperature which is not higher than a recrystallization temperature, and molten metal forging in which pressurizing is performed in the semi-solidified state may be used.

Also, in the case where an amorphous alloy member is manufactured by forging technique, the member may be manufactured by using a forging mold on which an irregular-shaped region 24A is formed, like the case where an amorphous alloy member is manufactured by the aforementioned casting technique.

Figure 4A:
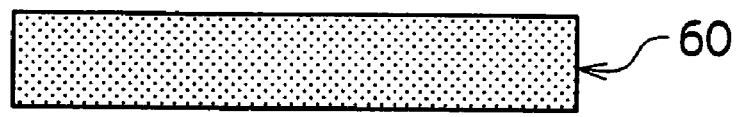
FIGS. 4A to 4D are a schematic view showing a process for manufacturing an amorphous alloy member using the forging technique, of an exemplary embodiment of an aspect of the invention.

As forging technique using hot forging, specifically, first, as shown in FIG. 4A, a forging mold 60 is prepared. As a material for this forging mold 60, like the casting mold 20, a material having a softening temperature Ts which is sufficiently higher than a crystallization temperature Tx of an amorphous alloy used as a material for an amorphous alloy member 34, is used. For example, silicon and a quartz glass have a melting point of 1000° C. or higher, and may be suitably used as a forging mold 60.

Figure 4B:
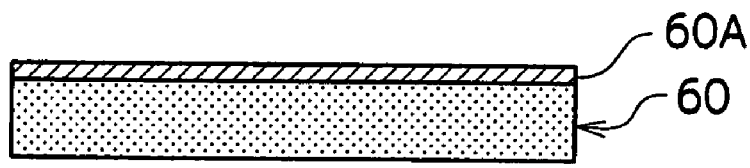

Next, as a mold manufacturing step shown in FIG. 4B, an irregular-shaped region 60A is formed on a surface of this forging mold 60. By transferring an irregular shape of this irregular-shaped region 60A onto an amorphous alloy member 34, the irregular region 34A is formed on the amorphous alloy member 34.

The irregular-shaped region 60A, like the irregular region 34A and the irregular-shaped region 24A, is a region formed of a fine irregular shape, and is a region represented by an irregular pattern due to sequence of regular or irregular indentation portions and protrusion portions. And, a center line average roughness Ra of the irregular-shaped region 60A is 0.1 μm or more and 1000 μm or less, and may be 0.1 μm or more and 100 μm or less.

Also in formation of this irregular-shaped region 60A, like the irregular-shaped region 24A, from a viewpoint of forgery prevention, the region may be formed of the forging mold 60 by a method which is difficult to be reproduced even when a manufacturer forms the irregular-shaped region 60A under the same environment and the same condition.

A method of forming this irregular-shaped region 60A may be a method which is difficult to manufacture the same shape even under the same environment and the same condition as described above like the irregular-shaped region 24A and, for example, nicking processing by pressing or the like, cutting processing by a bite, discharge processing, and blast processing using an abrasive particle, on a surface of the forging mold 60 may be used.

For this reason, a shape and characteristic of each irregular-shaped region 60A become unique to each forging mold 60 on which an irregular-shaped region 60A is formed.

Next, an amorphous alloy substrate 35 composed of the aforementioned amorphous alloy is prepared. This amorphous alloy substrate 35 is processed so that a center line average roughness Ra of at least a region on which an irregular region is formed is 0.01 μm or less.

Such amorphous alloy substrate 35 may be manufactured by preparing a casting mold in which all regions of a concave part 24 is mirror plane-processed so that a center line average roughness Ra is 0.01 μm or less, as a casting mold 20, and using this casting mold to perform casting like the casting technique, in manufacturing of the amorphous alloy member 34 explained using FIG. 2.

Figure 4C:
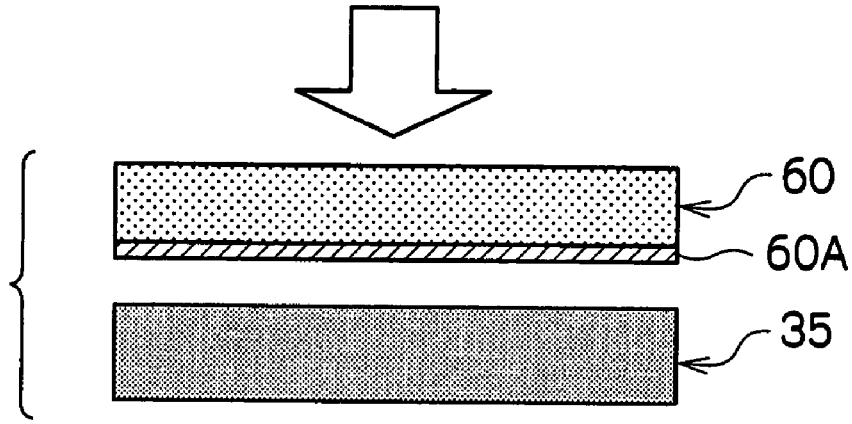

Then, as a plasticity-processing step shown in FIG. 4C, a region on which the irregular-shaped region 60A of the forging mold 60 is faced with a region of the above prepared amorphous alloy substrate 35, which has been processed to a center line average roughness Ra of 0.01 μm or less.

Further, in the case of hot forging, in order to suppress oxidation of an amorphous alloy, the amorphous alloy substrate 35 is heated in vacuum or in the inert gas such as Ar, so that a temperature of at least a surface of a region opposite to the forging mold 60, of the amorphous alloy substrate 35 becomes not lower than a glass transition point Tg of the amorphous alloy of the amorphous alloy substrate 35. This heating method may be performed by using a high frequency heating heater or the like.

At the same time with heating this amorphous alloy substrate 35, the forging mold 60 may be heated to a supercooled liquid temperature region ΔTx (ΔTx (supercooled liquid temperature region)=Tx (crystallization temperature of amorphous alloy)−Tg (glass transition point)) of the amorphous alloy of the amorphous alloy substrate 35.

In this state, a constant pressure is applied to the amorphous alloy substrate 35 with the forging mold 60 for a predetermined time and the like.

This constant pressure may be such a pressure that a surface of an amorphous alloy substrate in the supercooled liquid state may be plasticity-deformed, and is determined by a kind of the amorphous alloy of the amorphous alloy substrate 35. This predetermined time may be such a time that, the irregular-shaped region 60A on the forging mold 60 may be transferred onto a surface of the amorphous alloy substrate 35 by application of the constant pressure, and is determined by a size of a supercooled liquid temperature region of a material of the amorphous alloy substrate 35.

Figure 4D:
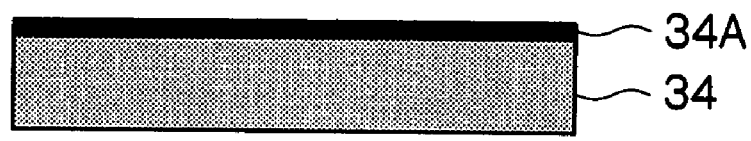

Via the plasticity-processing step, the irregular-shaped region 60A of the forging mold 60 is transferred onto a surface of the amorphous alloy substrate 35, and the amorphous alloy member 34 on which the irregular region 34A is formed, may be manufactured as shown in FIG. 4D.

As described above, since the amorphous alloy of the amorphous alloy member 34 has better transferring property, the amorphous alloy member 34 having the irregular region 34A onto which the irregular-shaped region 60A of the forging mold 60 has been correctly transferred over fine parts, may be manufactured by using forging technique.

When the amorphous alloy member 34 is manufactured using hot forging, an amorphous alloy constituting an amorphous alloy member is preferably an amorphous alloy having a supercooled liquid temperature region ΔTx of 30 K or more because a temperature management width has a room, and molding is easy. As an amorphous alloy having such property, particularly, it is preferable to use an amorphous alloy having a composition represented by the formula (8) because the amorphous forming ability is excellent.

When the amorphous alloy member 34 is manufactured by cold forging in which molding is performed at a normal temperature not higher than a recrystallization temperature, in the plasticity-processing step, a constant pressure may be applied to the amorphous alloy substrate 35 with the forging mold 60 for a prescribed time under a normal temperature without heating the amorphous alloy substrate 35, and under a normal temperature also regarding the forging mold 60.

A pressure level and a pressuring time in cold forging may be adjusted so that plasticity deformation becomes possible.

In addition, when the amorphous alloy member 34 is manufactured by molten metal forging in which pressurizing is performed in the semi-solidified state, a material excellent in the amorphous forming ability may be selected, and a time may be managed strictly so that crystallization of a material does not progress.

Since a material of the amorphous alloy member 34 is an amorphous alloy, transferring property is excellent, transference of the aforementioned fine irregular shape having a center line average roughness Ra of 0.1 μm to 1000 μm may be attained at a high precision, and transference of irregular-shaped regions formed in the casting mold 20 and the forging mold 60 may be performed at a better precision.

For this reason, when the same casting mold 20 or forging mold 60 is used, a manufacturer may manufacture the amorphous alloy member 34 on which the irregular region 34A having the same characteristic is formed, at a large scale, for every mold (casting mold 20, and forging mold 60).

In addition, in order to improve abrasion resistance of a surface of the amorphous alloy member 34 on which the irregular region 34A is formed, a ceramic-based hardened film may be formed on a surface.

This hardened membrane may be formed, for example, by the following method.

By heat-treating the amorphous alloy member 34 manufactured by the aforementioned casting technique or forging technique at a temperature and for a time in an amorphous region of an isothermal transformation curve (TTT curve) of a material of the amorphous alloy member 34 in the atmosphere containing oxygen or nitrogen, a ceramic-based hard layer containing, as the main component, a ceramic component composed of any one or both of oxide and nitride formed by conversion into a ceramic, of at least one element included the amorphous alloy member 34 may be formed, as a hardened membrane, on a surface of the amorphous alloy member 34.

Since a hardened membrane is formed by a heat-treating method like this, a strong hard membrane may be integratedly formed on the amorphous alloy member 34 using a simple device, and the irregular region 34A may be protected.

Since the aforementioned heat treatment forms a hard membrane of a surface by maintaining an amorphous phase under the atmosphere containing oxygen or/and nitrogen at 1 ppm or more, or under the air atmosphere, it is preferable that the heat treating is performed anywhere in a range of a heat treating temperature and a heat treating time shown in the following (1) to (4): (1) heat treating temperature 350° C., heat treating time 10 minutes, (2) heat treating temperature 350° C., heat treating time 120 minutes, (3) heat treating temperature 420° C., heat treating time 120 minutes, (4) heat treating temperature 450° C., heat treating time 10 minutes.

Which of these (1) to (4) heat treating temperatures and heat treating times should be used is determined by a size of a supercooled liquid temperature range of an amorphous alloy, and easiness of oxidation or nitrification, and is selected in view of a working efficiency or the like.

Since the thus formed ceramic-based hard layer, for example, a zirconia membrane is transparent, it does not influence on reading out result of the irregular region 34A with a forgery determination device described later at all. Even when a ceramic-based hard layer opaque to a light source wavelength is formed, since this hard layer is a layer obtained by conversion into a ceramic, of at least one kind element constituting the amorphous alloy member 34, unlike coating of a hard membrane on the amorphous alloy member 34 separately, a center line average roughness Ra of the irregular region 34A is hardly changed before and after heat treatment.

For this reason, the irregular region 34A formed on the amorphous alloy member 34 may be further protected from abrasion as compared with the case where no hard membrane is formed.

Next, a forgery determination device 10 using the amorphous alloy member 34 will be explained.

Figure 5:
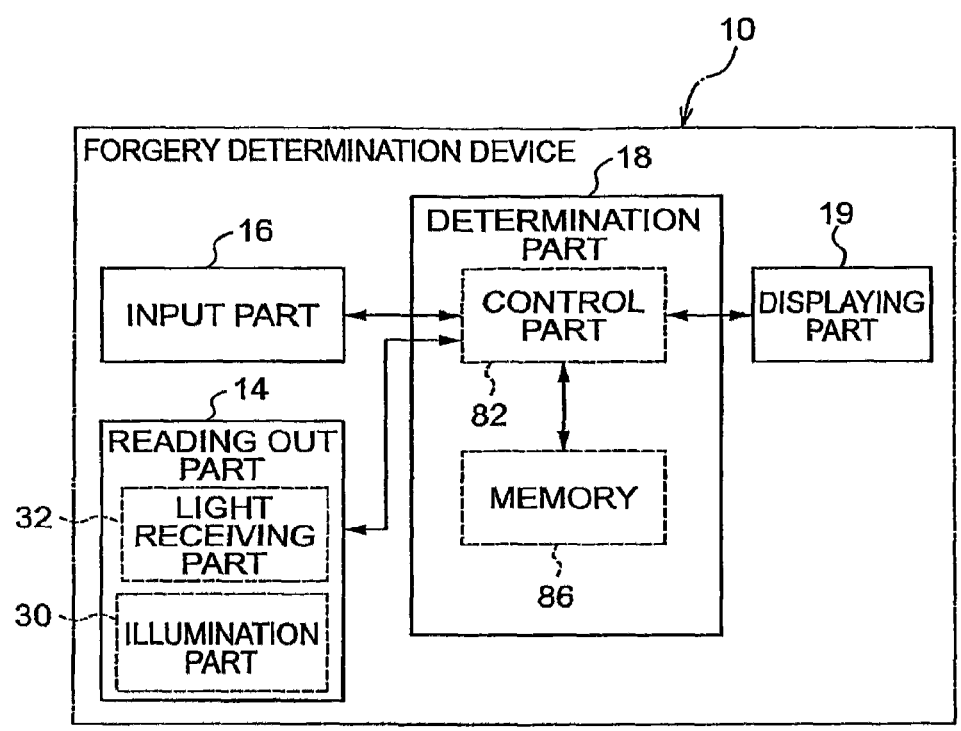
FIG. 5 is a block view showing one example of schematic construction of an authenticity determining device, of an exemplary embodiment of an aspect of the invention.

As shown in FIG. 5, the forgery determination device 10 of the present exemplary embodiment comprises a reading out part 14 for reading out characteristic of an irregular region 34A on a surface of an amorphous alloy member 34 (see FIG. 1), an input part 16, a determination part 18, and a display part 19. The determination part 18 comprises a control part 82 and a memory 86. The reading out part 14 includes an illumination part 30 and a light receiving part 32

The reading out part 14, the input part 16, the memory 86, and the display part 19 are connected to a control part 82 so that a signal may be given and received.

The reading out part 14, the input part 16, the determination part 18, and the displaying part 19 may be integratedly constructed, or may be constructed as physically different devices, and may be connected so that they may give and receive a signal each other with a cable or the like.

The input part 16 is operation-instructed by a user when various information is inputted. Specifically, when after the amorphous alloy member 34 is situated in a vicinity of, or contacted with the reading out part 14, a user performs reading out instruction for reading out characteristic of the irregular region 34A on the amorphous alloy member 34, operation instruction is performed. This input part 16 may be a keyboard, or may be a switch which is operated with a fingertip by an operator.

The displaying part 19 is for displaying various information. As the displaying part 19, a displaying device such as a liquid crystal monitor, CRT and the like may be used.

The determination part 18 determines authenticity (genuineness or spuriousness) of the amorphous alloy member 34 on which the irregular region 34A is formed, based on read out result with the reading out part 14. The control part 82 includes a microcomputer in which CPU (Central Processing Unit), ROM (Read Only Memory) and RAM (Random Access Memory) are connected via a bus so that data and command may be given and received, and controls various devices provided in the authenticity determination device 10.

The memory 86 stores reference characteristic information denoting information showing characteristic of the irregular region 34A on the amorphous alloy member 34 as a reference, an authenticity determination program described later, reference characteristic information registration program, and various data.

This authenticity determination program is a program for determining authenticity in the authenticity determination device 10. And, this reference characteristic information registration program is a program which is executed at registration of reference registration information.

Figure 6:
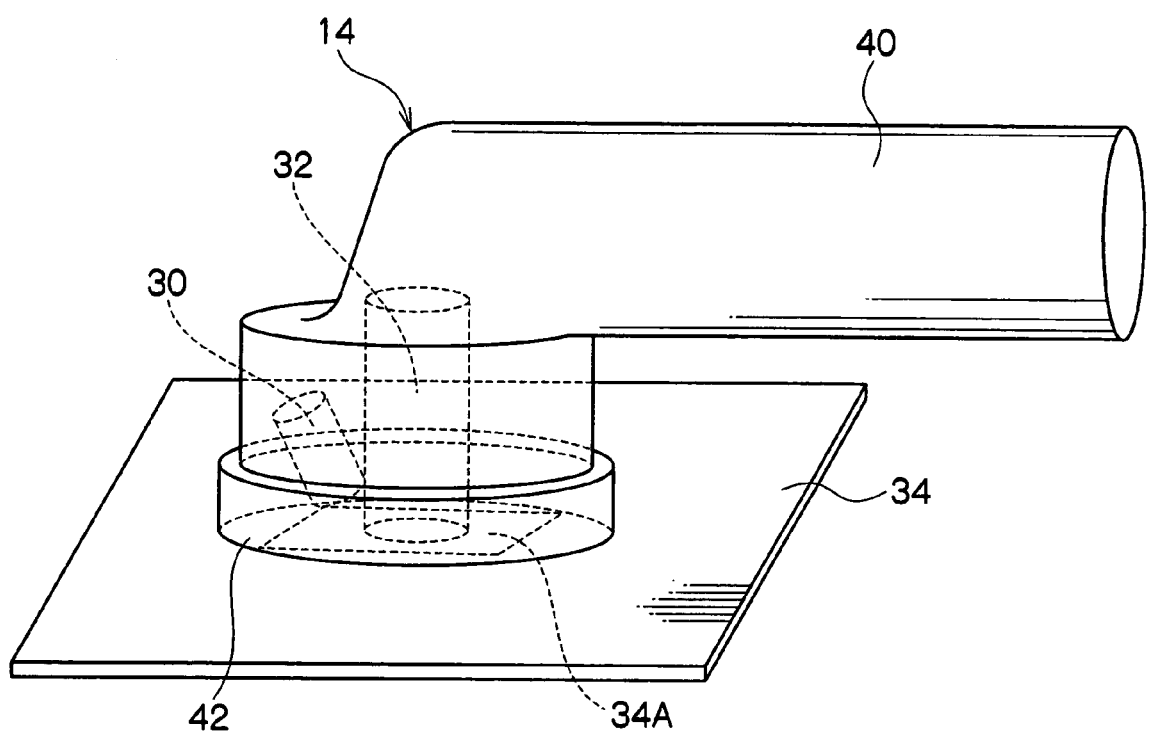
FIG. 6 is an external appearance view showing one example of a reading out part of an authenticity determining device, of an exemplary embodiment of an aspect of the invention.

The reading out part 14 includes, as shown in FIG. 6, an illumination part 30 of irradiating the irregular region 34A of the amorphous alloy member 34 with light, and a light receiving part 32 of receiving reflected light from the amorphous alloy member 34 of light irradiated by the illumination part 30, the illumination part 30 irradiates the amorphous alloy member 34 with light, and the light receiving part 32 receives the reflected light, thereby, the part reads out characteristic information showing characteristic of the irregular region 34A of the amorphous alloy member 34.

The reading out part 14 is formed into an approximately L-letter shape, its long side is a handle part 40 grasped by an operator, and the illumination part 30 and the light receiving part 32 are embedded on a short side so that its edge face becomes a reading out surface 42. The operator grasps the handle part 40, and pushes the reading out surface 42 against the irregular region 34A on a surface of the amorphous alloy member 34. By pushing the reading out surface 42 against the irregular region 34A like this, the reading out part 14 as a whole is brought into the optically closed state, and the surface state of the irregular region 34A on a surface of the amorphous alloy member 34 may be read out as characteristic of the irregular region 34A without influence of the disturbance light.

Figure 7:
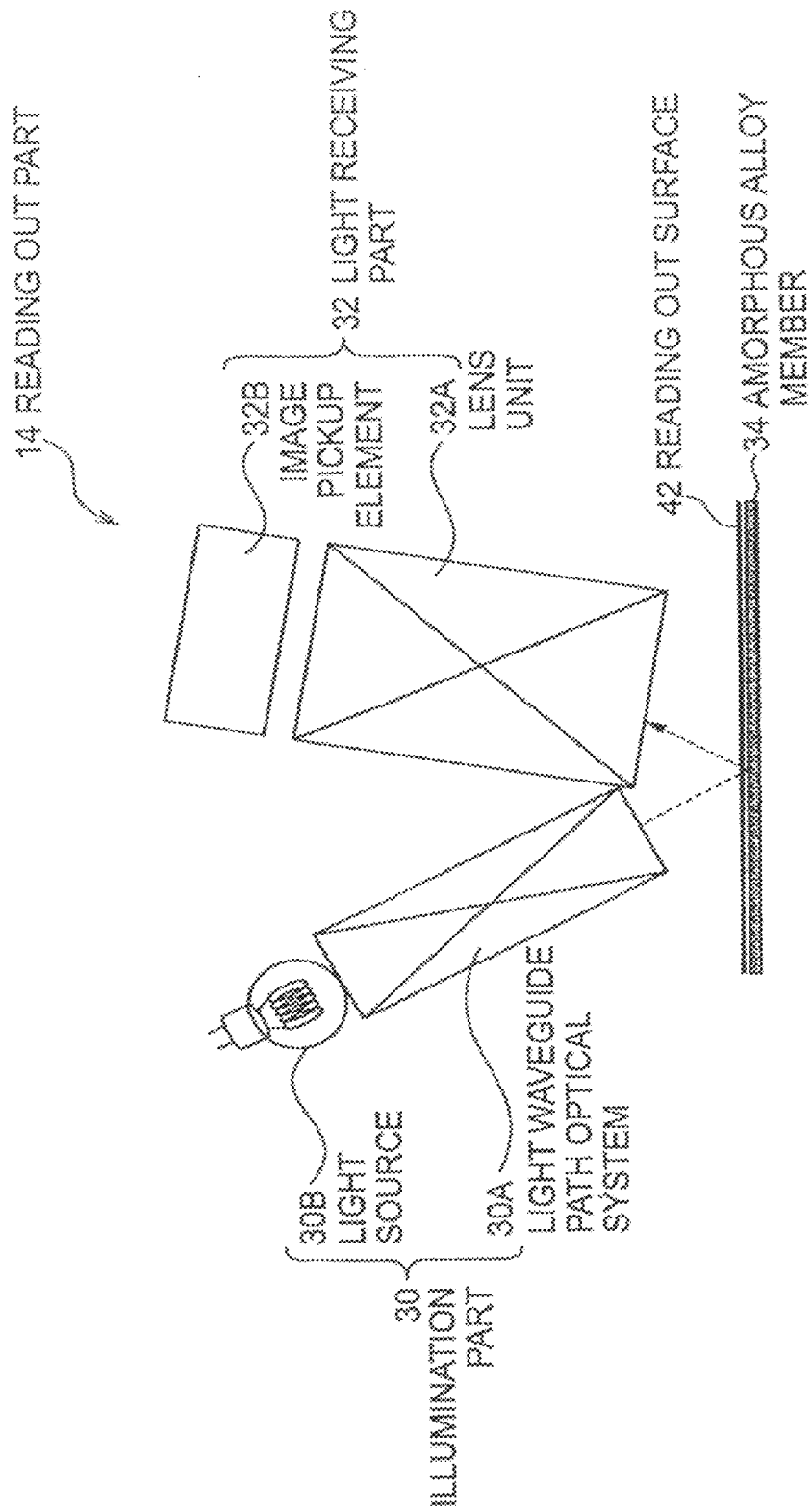
FIG. 7 is a detailed construction view of a reading out part.

As shown in FIG. 7, the illumination part 30 includes a light source 30B that outputs light, and a light waveguide path optical system 30A that guides light outputted from the light source 30B towards a direction of the reading out surface 42 to irradiate the irregular region 34A on a surface of the amorphous alloy member 34 contacted with the reading out surface 42. As the light source 30B, for example, LED, a halogen lump, a fluorescent lump, and a xenon discharge tube may be used. Alternatively, in place of the light waveguide path optical system 30A, a condensing lens of condensing light on a surface of the amorphous alloy member 34 may be used. Alternatively, a light shielding plate may be provided so that the surrounding light does not influence thereon.

The light receiving part 32 includes an image pickup element 32B, and a lens unit 32A that forms an image from the reflected light from a surface of the amorphous alloy member 34 of the illumination light irradiated by the illumination part 30, on a light receiving surface of the image pickup element 32B. As the image pickup element 32B, CMOS or CCD may be used, and characteristic of the irregular region 34A of each amorphous alloy member 34 is obtained as shading information showing the surface state of the irregular region 34A.

The present exemplary embodiment will be explained provided that reading out resolution with the image pickup element 32B is 400 bpi, and gradation of reading out with the reading out part 14 is a 8 bit gray scale. The reading out resolution and the gradation of reading out are not limited to such values.

Next, the process which is executed in the control part 82 of the authenticity determination 10 will be explained.

First, as described above, it is necessary to store in advance, in the memory 86, reference characteristic information showing characteristic of the irregular region 34A on the amorphous alloy member 34 which is genuine, that is, as a reference, before genuineness or spuriousness of the amorphous alloy member 34 to be determined, is determined.

First, the process which is executed in the control part 82 when this reference registration information is stored in the memory 86 will be explained.

Figure 8:
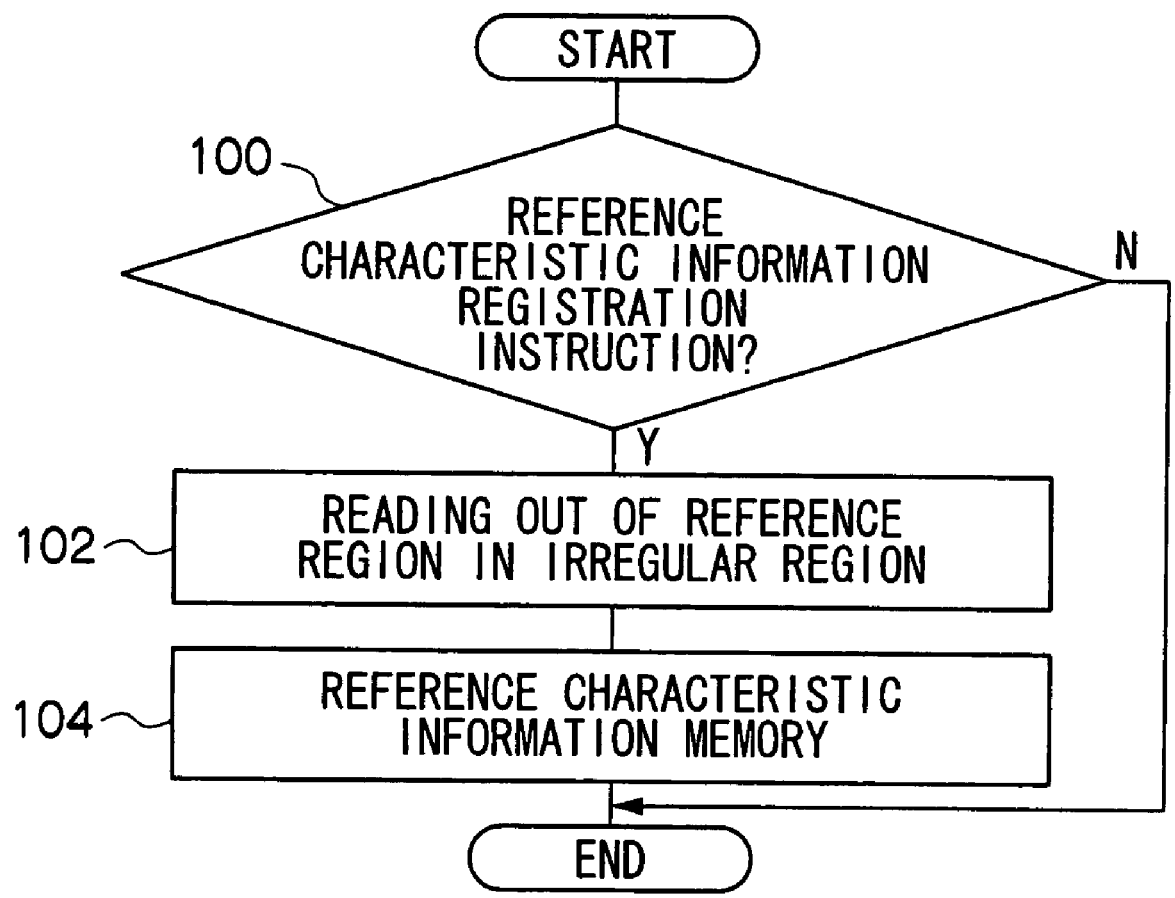
FIG. 8 is a flow chart showing reference characteristic information registering process which is performed in an authenticity determining device, of an exemplary embodiment of an aspect of the invention.

In the control part 82, processing routine shown in FIG. 8 is executed every predetermined time, progressing to a step 100.

In the step 100, it is determined whether a reference characteristic information registration instructing signal showing registration instruction of reference characteristic information has been inputted or not, and when denied, the present routine is completed.

Determination of the step 100 may be performed by determining whether a reference characteristic information registration instructing signal has been inputted from the input part 16 or not. Inputting of this reference characteristic information registration instructing signal into the control part 82 may be such that the handle part 40 is held by a user to push the reading out surface 42 to contact with the irregular region 34A of the amorphous alloy member 34, which is a genuineness or spuriousness determination reference and, at the same time, by operation of the input part 16 by a user, a key at a predetermined position for instructing registration of reference characteristic information is operated, or a predetermined position key is operated predetermined times and, at that time, a reference characteristic information registration instructing signal is outputted from the input part 16 to the control part 82.

Whether this reading out surface 42 has been pushed against a surface of the amorphous alloy member 34 or not may be determined, for example, by providing a sensor on the reading out surface 42, connecting this sensor to the control part 82 so that a signal may be given and received and, distinguishing an input signal from this sensor.

When affirmed in the step 100, a reference characteristic information registration program is read out from the memory 86, progressing to a step 102. By executing this reading out reference characteristic information registration program in the control part 82, processing of registering reference registration information into the memory 86 is performed. This reference characteristic information registration program corresponds to processing of the following step 102 to step 104.

In the step 102, as reference characteristic information showing characteristic of the irregular region 34A of the amorphous alloy member 34, a reference region 50 of a predetermined size in the irregular region 34A of the amorphous alloy member 34, which is a genuineness or spuriousness determination reference (see FIG. 9A), is read out.

This reference region 50 is a region that may be at any position on the amorphous alloy member 34, and is a region of a predetermined size narrower than the irregular region 34A. The present exemplary embodiment will be explained provided that the region is a region of 32×32 dot.

In the present exemplary embodiment, since reading out resolution with the image pickup element 32B is 400 dpi, gradation of reading out with the reading out part 14 is a 8 bit gray scale, and the reference region 50 is a region of a width of 32×32 dot (about 2 mm×about 2 mm) on the irregular region 34A, a data size of reference characteristic information becomes 1024 bytes, and gradation values (lightness values) of individual pixels (dots) become integer values in a range of 0 to 255.

Figure 9B:
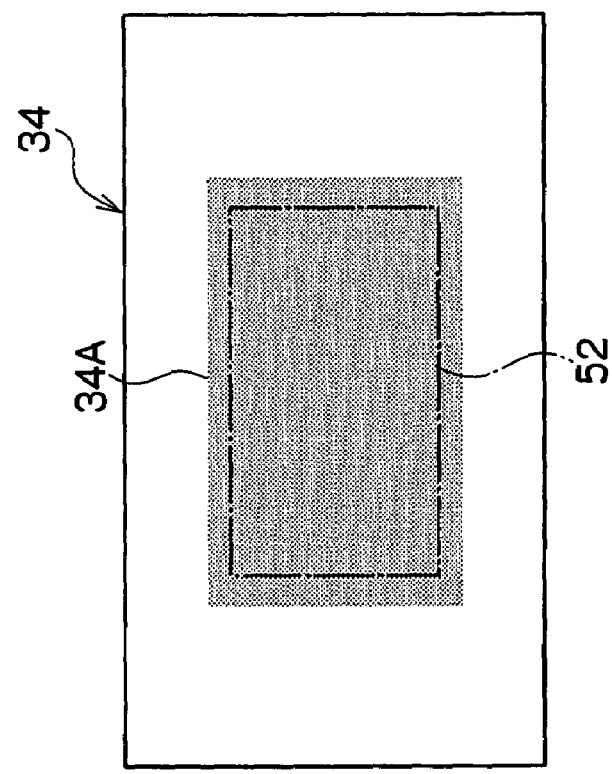
FIG. 9B is a schematic view showing a collation region in an irregular region of an amorphous alloy member.
Figure 9A:
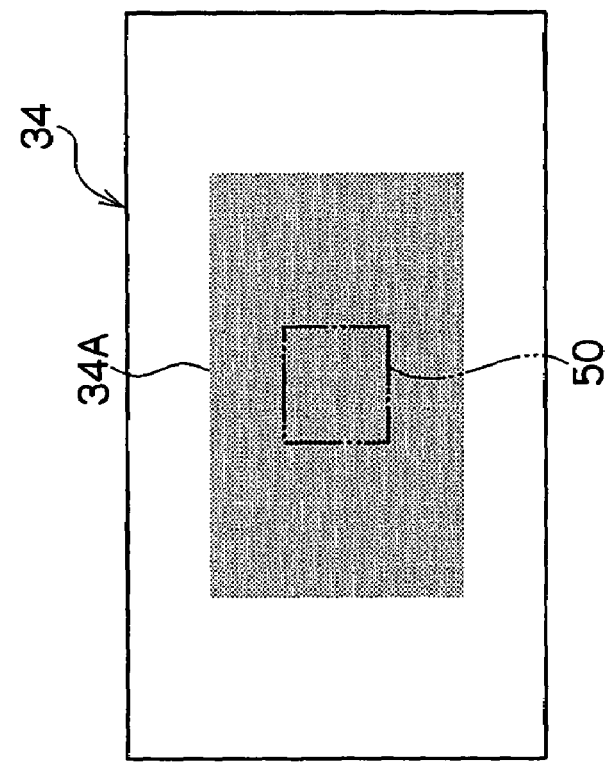
FIG. 9A is a schematic view showing a reference region in an irregular region of an amorphous alloy member, of an exemplary embodiment of an aspect of the invention.

As shown in FIG. 9A, by processing of the step 102, shading information showing the surface state of the reference region 50 in the irregular region 34A of the amorphous alloy member 34, which is an authenticity determination reference, is read out as reference characteristic information showing characteristic of the irregular region 34A of the amorphous alloy member 34, which is an authenticity reference.

One example of a reference image obtained by visualizing (contrast-correcting so that observation with naked eyes becomes easy) an image represented by reference characteristic information (hereinafter, referred to as reference image), based on the reference characteristic information obtained by reading out of the reference region 50 in the irregular region 34A of the step 102, will be shown in FIG. 10A.

The present exemplary embodiment will be explained provided that a size of the reference region 50 is 32×32 dot, but the size is not limited to such value but generally, as sizes of the reference region 50 and a collation region 52 (details of which will be described later) as a reading out region on the irregular region 34A on the amorphous alloy member 34, which is to be determined, become larger, a determination precision of authenticity determination is improved.

In the next step 104, after reference characteristic information read out in the step 102 is stored in a memory 86, the present routine is completed.

Since an irregular region 34A depending on the same mold is formed on the amorphous alloy member 34 manufactured using the same mold (casting mold 20, forging mold 60) as explained in the method of manufacturing the amorphous alloy member 34, one of a plurality of amorphous alloy members 34 manufactured in the same mold is determined as the amorphous alloy member 34 which is a authenticity determination reference, and processing routine shown in FIG. 8 may be executed.

By doing this, reference characteristic information which is a reference for determining authenticity may be stored in a memory 86 for every amorphous alloy members 34 manufactured using the same mold.

Next, authenticity determination of the amorphous alloy member 34 which is a subject of authenticity determination will be explained.

Figure 11:
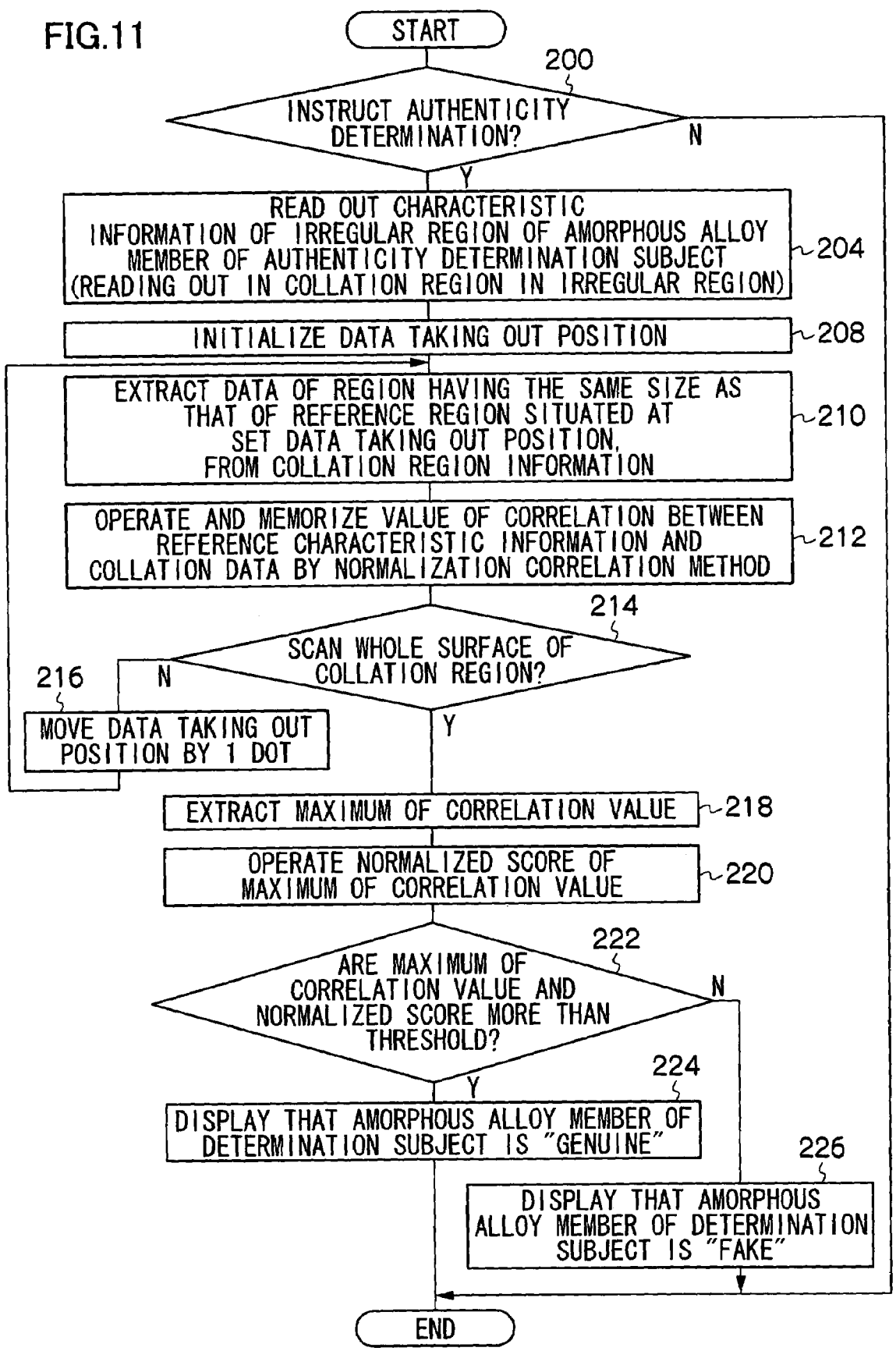
FIG. 11 is a flow chart showing authenticity determination process which is performed in an authenticity determining device, of an exemplary embodiment of an aspect of the invention.

In the control part 82, processing routine shown in FIG. 11 is executed every predetermined time, progressing to a step 200, and whether an authenticity determination instructing signal showing authenticity determination instruction has been inputted or not is determined and, when denied, the present routine is completed.

Determination in the step 200 may be performed by determining whether an authenticity determination instructing signal has been inputted from an input part 16 or not. Inputting of this authenticity determination instructing signal into the control part 82 may be such that a handle part 40 is held by a user to push the reading out surface 42 against the irregular region 34A of the amorphous alloy member 34 which is a subject of authenticity determination to contact them and, at the same time, by operation of the input part 16 by a user, a key at a predetermined position for instructing execution of authenticity determination is operated, or a predetermined position key is operated predetermined times and, at that time, an authenticity determination instructing signal is outputted from the input part 16 to the control part 82.

When affirmed in the step 200, an authenticity determination program is read out from the memory 86, progressing to a step 204. By executing this read out authenticity determination program in the control part 82, authenticity determination processing is performed in the control part 82. This authenticity determination program corresponds to processing of the following step 204 to step 226.

In the next step 204, as determination subject characteristic information showing characteristic of the irregular region 34A of the amorphous alloy member 34 which is a subject of authenticity determination, a collation region 52 having a predetermined size in the irregular region 34A of the amorphous alloy member 34 that is a subject of authenticity determination (see FIG. 9B) is read out.

As shown in FIG. 9B, this collation region 52 is a region which may be at an arbitrary position on the amorphous alloy member 34, and is a region having a size smaller than that of the irregular region 34A and having a size larger than that of the aforementioned reference region 50.

For example, when a region of 32×32 dot (about 2 mm×2 mm) is defined as the reference region 50, as shown in FIG. 9B, a region which is larger than the reference region 50 and includes the reference region 50 is read out as a collation region (e.g. 64×64 dot (about 4 mm×4 mm)) 52.

By processing of the step 204, as shown in FIG. 9B, shading information showing the surface state in the collation region 52 in the irregular region 34A of the amorphous alloy member 34 which is a subject of authenticity determination is read out as determination subject characteristic information showing characteristic of the irregular region 34A of the amorphous alloy member 34 which is a subject of authenticity determination.

Figure 10B:
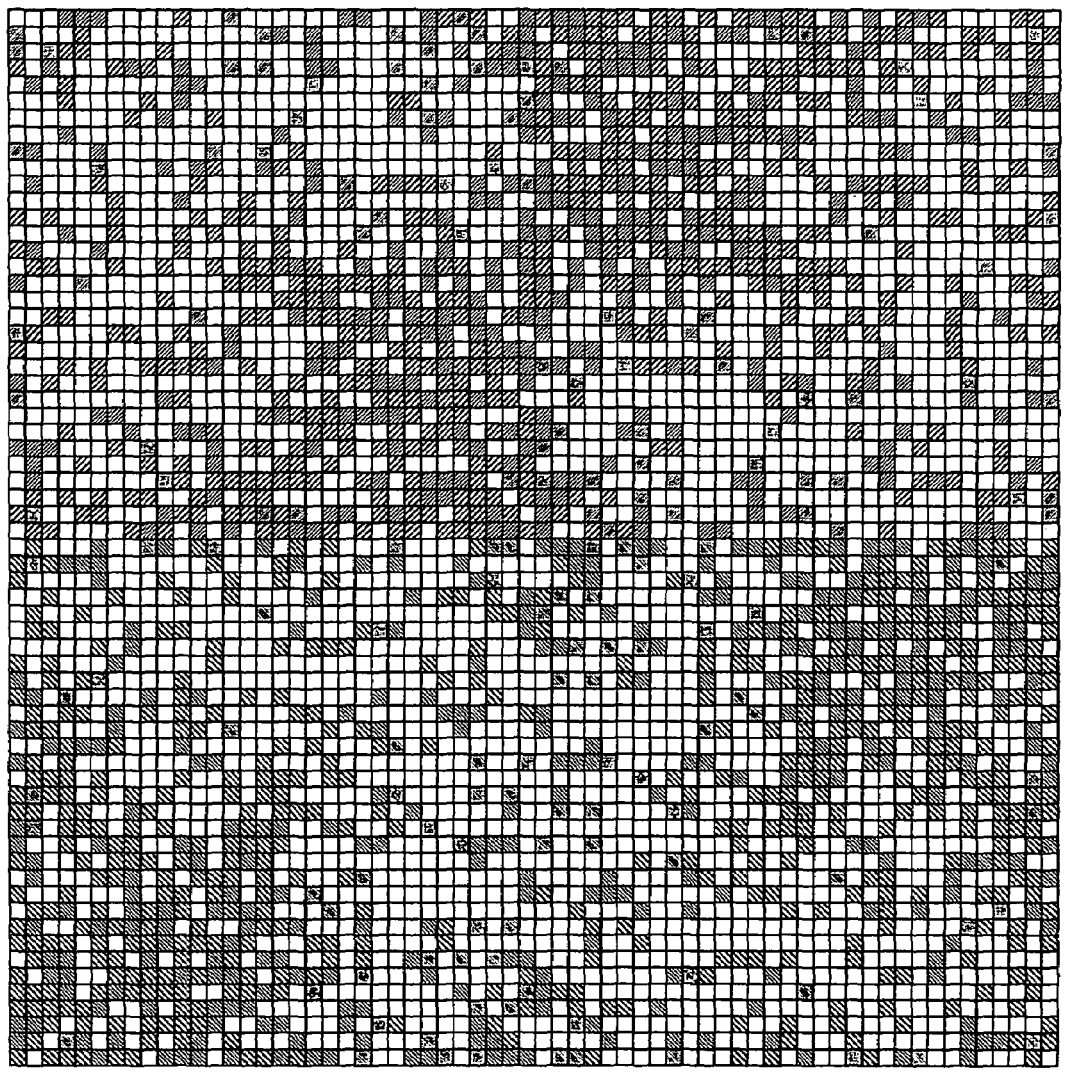
FIG. 10B is an image view showing one example of a collated image.
Figure 10A:
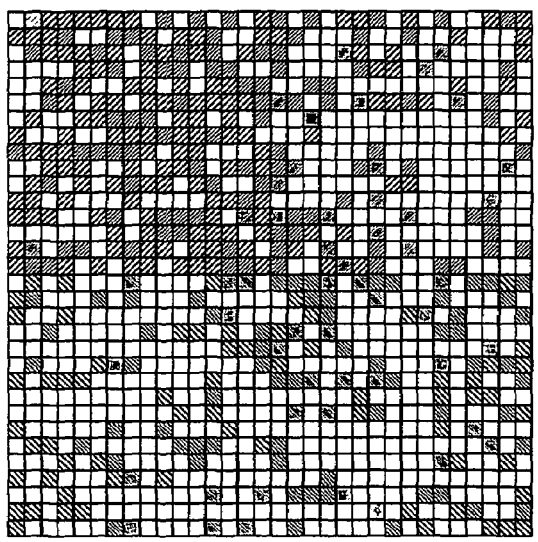
FIG. 10A is an image view showing one example of a reference image.

One example of a collation image obtained by visualizing (contrast-correcting so that observation with naked eyes becomes easy) an image represented by determination subject characteristic information (hereinafter referred to as collation image) based on this determination subject characteristic information obtained by reading out of the reference region 50 in the irregular region 34A of the step 204 is shown in FIG. 10B.

In the next step 208, a data taking out position (position of operation subject region) in the collation region 52 is initialized.

In authenticity determination processing of the present exemplary embodiment, details of which will be described later, data corresponding to a region (operation subject region) of the same size as that of the reference region 50 is taken out from data of the collation region 52, and a value of correlation between the data and reference characteristic information stored in the memory 86 is subjected to operation, and this is repeated while a position of the operation subjected region is moved. For this reason, in the step 208, a data taking out position (position of operation subject region) in the collation region is initialized.

In the next step 210, data of the same size as that of the reference region 50 situated at a set data taking out position (hereinafter, referred to as collation data) is taken out from determination subject characteristic information as data of the collation region 52.

In the next step 212, according to the following equation (1), a value of correlation between reference characteristic information stored in the memory 86 and collation data extracted in the step 210 is subjected to operation by a normalization correlation method, and a correlation value obtained by operation is stored in the memory 86.

$$F = \{f_i\}_{i=0}^{N-1} \quad G = \{g_i\}_{i=0}^{N-1} \quad (1)$$

$$\text{Correlation value} = \frac{\sum_{n=0}^{N-1}(f_n - f_{AVE})(g_n - g_{AVE})}{\sqrt{\sum_{n=0}^{N-1}(f_n - f_{AVE})^2}\sqrt{\sum_{n=0}^{N-1}(g_n - g_{AVE})^2}}$$

In equation (1), F is a reference image (a set of reference characteristic information), fi is a lightness value of individual pixels of a reference image, N is the total pixel number of a reference image (and a partial region of a collation image), G is (a set of) a partial region of a collation image, gi is a lightness value of individual pixels of a partial region of a collation image, $f_{AVE}$ is an average of a lightness value of individual pixels of a reference image, and $g_{AVE}$ is an average of a lightness value of individual pixels of a partial region of a collation image.

In the next step 214, whether an operation subject region has scanned a whole surface of the collation region 52 or not is determined. When denied in the step 214, progressing to a step 216 and, after a data taking out position is moved by one dot in a length direction or a width direction, processing is returned to the step 210.

That is, until determination of the step 214 is affirmed, processing from the step 210 to the step 216 is repeated.

As described above, by moving a region of the same size as that of the reference region 50 in the collation region 52 dot by dot by performing the aforementioned operation regarding each of collation data of the same size as that of the reference region 50 for every movement, letting the dot number of the reference image to be m×n, and the dot number of the collation image to be M×N, (M−m+1)×(N−n+1) correlation values per single collation image are obtained.

In the present exemplary embodiment, since the reference region 50 is 32×32 dot, and the collation region 52 is 64×64 dot, operation of a correlation value is performed (64−32+1)×(64−32+1)=1089 times, and 1089 correlation values are obtained.

When determination of the step 214 is affirmed, progressing to a step 218, and a maximum value is extracted from multiple correlation values obtained by performing processing of the step 208 to the step 214.

In the next step 220, as a characteristic amount representing a distribution situation of multiple correlation values obtained by performing processing of the step 200 to the step 214, a normalized score of a maximum value extracted in the step 218 is subjected to operation according to the following equation (2).

$$\text{Normalized score} = (\text{maximum of correlation value} - \text{average of correlation value}) \div \text{reference deviation of correlation value} \quad (2)$$

In the next step 222, it is determined whether a maximum of correlation values obtained in the step 218 is not less than a threshold or not, and a normalized score operated in the step 220 is not less than a threshold or not.

Herein, as shown by the technique of JP-A No. 2005-038389 by the present inventors, when the collation region 52 including the reference region 50 of the irregular region 34A of the same amorphous alloy member 34 has been read out without slippage of a position and a direction, a maximum of a correlation value exhibits a very high value. In addition, a distribution of a correlation value is such that a correlation value exhibits a very low value as compared with a maximum at a part other than a peak part where a correlation value is maximum and, accompanying with this, a normalized score of a maximum of a correlation value exhibits also a very high value.

When the irregular region 34A of the different surface shape has been read out, a maximum of a correlation value becomes a very low value and, also regarding a distribution of a correlation value, a whole correlation value including a peak part exhibits a low value, and a normalized score of a maximum of a correlation value becomes a very low value.

On the other hand, when the collation region 52 including the reference region 50 of the irregular region 34A of the same amorphous alloy member 34 has been read out by slightly changing a position and a direction, a maximum of a correlation value and a normalized score of a maximum of a correlation value are both become an intermediate value between the case where the collation region 52 including the reference region 50 of the irregular region 34A of the same amorphous alloy member 34 has been read out without slippage of a position and a direction, and the case where the collation region 52 including the reference region 50 of the irregular region 34A of the different surface shape has been read out.

As erroneous determination in authenticity determination, there are the case where the genuine is erroneously determined to be the fake, and the case where the fake is erroneously determined to be the genuine (a probability of erroneously determining the genuine to be the fake is referred to as FRR (:False Rejection Rate), and a probability of erroneously determining the fake to be the genuine is referred to be as FAR (:False Acceptance Rate)).

In the authenticity determination device of the present exemplary embodiment, in order to reduce these FRR and FAR, as a threshold for authenticity determination, each of a threshold of a maximum of a correlation value and a threshold of a normalized score of a maximum of a correlation value is defined as an intermediate value between the case where the correlation region 52 including the reference region 50 of the irregular region 34A of the same amorphous alloy member 34 has been read out without slippage of a position and a direction, and the case where the collation region 52 including the reference region 50 of the irregular region 34A of the different surface shape has been read out.

This threshold may be stored in the memory 86 in advance.

In addition, multiple sets of reference characteristic information are stored, corresponding to each reference characteristic information, each of a threshold of a maximum of the correlation value measured in advance, and a threshold of a normalized score of a maximum of the correlation value are stored in the memory 86 and, at determination of the step 222, a threshold corresponding to reference characteristic information used in operation in the step 212 may be read out.

Since authenticity determination is performed by comparing a maximum of a correlation value with a threshold and, at the same time, comparing a normalized score of a maximum of a correlation value with a threshold in processing of the step 222 like this, a determination precision of authenticity determination may be improved compared to the case where determination is performed using only a maximum of a correlation value, in the case where a probability that the genuine is erroneously determined to be the fake, such as slight slippage of a reading out position and direction with the reading out part 14 from a position and a direction at reference region 50 reading out, at reading out of the irregular region 34A on the amorphous alloy member 34 which is a subject of authenticity determination, is high.

When affirmed in the step 222, after a message indicating that the amorphous alloy member 34 of an authenticity determination subject is the "genuine" is displayed in the displaying part 19, the present routine is completed.

On the other hand, when denied in the step 222, after a message indicating that the amorphous alloy member 34 of an authenticity determination subject is the "fake" is displayed in the displaying part 19, the present routine is completed.

As explained above, according to the authenticity determination device 10 of the present exemplary embodiment, reference characteristic information which is a reference for determining authenticity is stored in the memory 86 in advance for every amorphous alloy members 34 manufactured using the same mold, the irregular region 34A of the amorphous alloy member 34 which is a subject of authenticity determination is read out, and authenticity of the amorphous alloy member 34 which is a subject of authenticity determination is determined based on determination subject characteristic information indicating characteristic of the irregular region 34A, and reference characteristic information.

For this reason, in the prior art, information indicating characteristics of individual medium surfaces is registered in advance and, at authenticity determination, characteristic information on a medium which is a subject of authenticity determination is read out, and whether characteristic information consistent with the read out result is present in pre-stored characteristic information for every media or not is determined, thereby, authenticity determination is performed, while in the authenticity determination device 10 of the present exemplary embodiment, one amorphous alloy member 34 of a plurality of amorphous alloy members 34 manufactured using the same mold (casting mold 20, forging mold 60) is used as the amorphous alloy member 34 which is a reference, and reference characteristic information indicating characteristic of the irregular region 34A of this amorphous alloy member 34 may be stored in advance.

Like this, according to the authenticity determination device 10, since using one of a plurality of amorphous alloy members 34 manufactured from the same mold as an amorphous alloy member which is a reference of authenticity determination, information indicating characteristic of an irregular region of this amorphous alloy member may be stored as reference characteristic information in advance, troublesomeness of data registration processing in authenticity determination may be suppressed and, at the same time, data management may be simplified as compared with the prior art.

Therefore, authenticity may be determined easily with a simple construction.

In addition, according to the authenticity determination device 10, authenticity determination is performed using the amorphous alloy member 34 including an amorphous alloy. Since the amorphous alloy member 34 is composed of an amorphous alloy having good transferring property, the irregular region 34A on the amorphous alloy member 34 is a region formed by faithfully transferring the irregular-shaped region 24A of the casting mold 20 or the irregular-shaped region 60A of the forging mold 60 over fine parts, the amorphous alloy member 34 manufactured from the same casting mold 20 or casting mold 60 has the same shape and characteristic of the irregular region 34A.

For this reason, since occurrence of variation in a shape of the irregular region 30A of the amorphous alloy member 34 manufactured from the same mold due to variation at manufacturing may be suppressed, the same authenticity determination result may be obtained regarding each of a plurality of amorphous alloy members 34 which are the determination subjects, manufactured using the same mold. For this reason, authenticity determination may be performed at a better precision.

Further, since the amorphous alloy has a high strength and a high hardness, change in the surface state of the irregular region 34A due to abrasion may be suppressed and, therefore, authenticity determination may be performed at a better precision.

Therefore, the authenticity determination device which may determine authenticity easily and at a high precision may be provided.

Next, one exemplary embodiment in which the reference characteristic information registration processing, and the authenticity determination processing which are executed in the control part 82 of the determination part 18 of the authenticity determination device 10 are executed by a personal computer will be explained.

Figure 16:
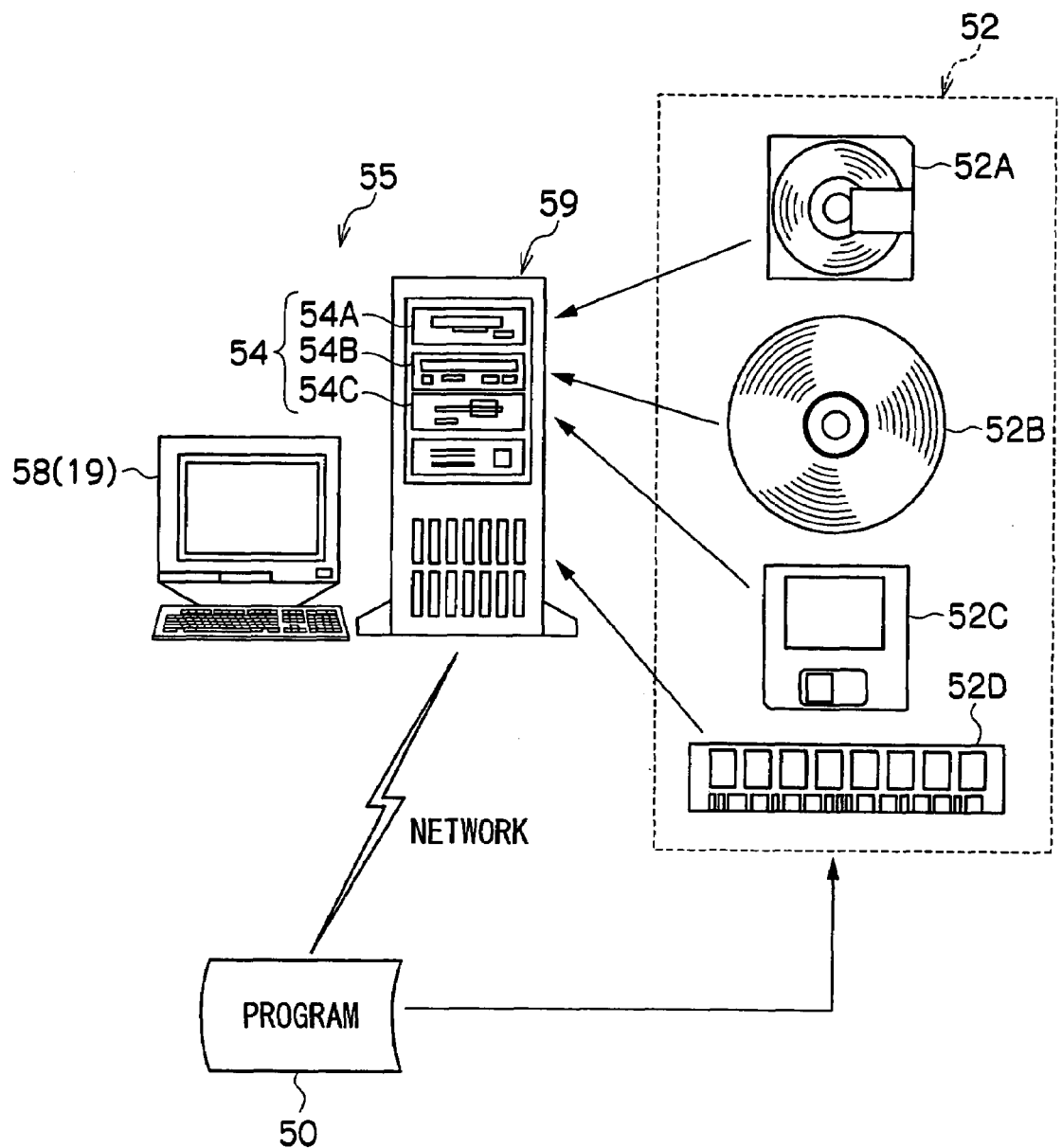
FIG. 16 is a schematic view showing one exemplary embodiment when authenticity determining process is performed by a personal computer.

As shown in FIG. 16, a personal computer (hereinafter, referred to as computer) 55 comprises a display 58 which displays various information, and a computer body 59. On the surface side of the computer body 59, the disc equipment 54 for mounting a memory medium 52 is provided.

Herein, the function of reference characteristic information registration processing and the function of authenticity determination processing explained in the authenticity determination processing device 10 may be realized by a program 150 which may be executed in the computer 55.

As the program 150 which may be executed by this computer, the reference characteristic information registration program and the authenticity determination program used in the authenticity determination processing device 10 may be used by converting them into a code which may be executed by the computer 55.

The program 150 and data used by the program 150 may be also stored in a memory medium 52 shown in FIG. 17 described later which may be read out by the computer 55 in advance, or may be stored in HDD 62 or ROM 61 described later in the computer 55 in advance.

The memory medium 52 causes the state of change in an energy such as magnetism, light, and electricity, on a reading out device 54 equipped in a hardware resource of the computer 55 depending on the description content of the program, and may transmit the description content of the program to the reading out device 54 in a format of a signal which may respond thereto.

As such memory medium 52, there is a magneto-optical disc 52A, an optical disc 52B, a magnetic disc 52C, and a memory 52D which may be mounted in a PC body 59. One example of the memory 52D includes an IC card and a memory card. These memory media 52 may be any of a conveyable type and a non-conveyable type.

Examples of the reading out device 54 include a magneto-optical disc device 54A for reading out various data stored in the magneto-optical disc 52A, an optical disc device 53B for reading out various data stored in the optical disc 52B, and a magnetic disc device 54C for reading out various data stored in the magnetic disc 52C.

As shown in FIG. 17, the computer 55 includes CPU (Central Processing Unit) 160, ROM (Read Only Memory) 61, and RAM (Random Access Memory) 63. These CPU 160, ROM 61 and RAM 63 are connected so that a signal may be given and received, with a host bus 71 constructed of a CPU bus or the like. A construction consisting of these CPU 160, ROM 61, and RAM 63 has the same function as that of the determination part 18 of the above-explained authenticity determination device 10.

CPU 160 has the same function as that of the control part 82 of the above-explained authenticity determination device 10, and is a control part which executes processing according to the program 150. ROM 61 stores a program used by CPU 160, an operation parameter, a program 150 and the like. RAM 63 stores a program used for execution of CPU 160, a parameter which is appropriately changed in the execution and the like. A memory part 87 consisting of ROM 61 and RAM 63 functions as the memory 86 of the above explained authenticity determination device 10.

The host bus 71 is connected to an external bus 66 such as a PCI (Peripheral Component Interconnect/Interface) via a bridge 64, so that data and a signal may be given and received.

A keyboard 260, a pointing device 65 such as a mouse, a display 58, HDD (Hard Disc Drive) 62, a reading out device 54, a connecting port 67, a communicating part 70, a reading out part 14, and a data outputting part 56 are provided in the computer 55.

The keyboard 260, pointing device 65 such as a mouse, display 58, HDD (Hard Disc Drive) 62 for storing various data, reading out device 54, connecting port 66, communicating part 70, reading out part 14 and data outputting part 56 are connected to CPU 160 via an interface 68, an external bus 66, a bridge 64, and a host bus 71, so that a signal may be given and received.

The keyboard 260 and a pointing device 65 are an input device which is operated by an operator, and has the same function as that of the input part 16 of the authenticity determination device 10.

The display 58 includes a liquid crystal displaying device or CRT (Cathode Ray Tube), is a device which displays various information as text or image information, and has the same function as that of the displaying part 19 of the authenticity determination device 10.

By mounting the memory medium 52 in the reading out device 54, various data stored therein such as a program 150 are read out with the reading out device 54. By control with CPU 160, the reading out device 54 reads out various data such as a program 150 stored in the mounted memory medium 52. An authenticity determination program and data read out with the reading out device 54 are stored in RAM 63 via an interface 68, an external bus 66, a bridge 64, and a host bus 71 by control of CPU 160.

The connecting port 67 is a port for connecting an external connecting instrument 69 to be connected to the computer 55, and has a connecting part such as USB, and IEEE 1394. The communication part 70 is a device for giving and receiving data and a signal to and from an external device via a wire communication network or a wireless communication network not shown.

Since the reading out part 14 has the same construction as that of the reading out part 14 of the authenticity determination device 10, detailed explanation is omitted. The data output part 56 is an output device for outputting various data, such as a printer.

In such computer 55, when the memory medium 52 is mounted in the reading out device 54, CPU 160 reads out the program 150 stored in the memory medium 52, and stores it in RAM 63. In addition, when the program 150 is stored in HDD 62 or ROM 61, CPU 160 reads out the program 150 stored in the HDD 62 and ROM 61, and stores it in RAM 63.

In CPU 160, each of a reference characteristic information registration program, and an authenticity determination program of the program 150 stored in this RAM 63 is executed. By execution of this program 150 by CPU 160, processing routine shown in FIG. 8 and FIG. 11 is executed in CPU 160 and, in the computer 55, reference characteristic information registration processing and authenticity determination processing are executed as in the authenticity determination device 10.

As described above, by execution of the program 150 of reference characteristic information registration program and authenticity determination program in the computer 55, authenticity of the amorphous alloy member 34 may be determined with a simple construction.

EXAMPLES

In order to confirm a determination precision of authenticity determination in the case where an aspect of the invention is applied, an experiment which is performed by an aspect of the present inventors will be explained below.

Measurement of a center line average roughness Ra in each Example and Comparative Example is performed by the following method.

—Measurement of Center Line Average Roughness—

Based on the method of JIS B 0651, regarding an irregular region on the surface of an amorphous alloy member, a center line average roughness is measured at a measurement length of 12.5 mm and a cut off value of 2.5 mm prescribed in JIS B-0601, the disclosure of which is incorporated by reference herein, using a three-dimensional surface roughness measuring meter (SE-30K, manufactured by Kosaka Laboratory Ltd.).

Example 1

[Manufacturing of Casting Mold]

As a casting mold, a casting mold 20 having a shape shown in FIG. 2A, composed of SKD61 is prepared.

Next, by discharge-processing a concave part 24 of this casting mold 20, an irregular-shaped region 24A of 40 mm×20 mm is formed. When a center line average roughness Ra of this irregular-shaped region 24A is measured, a center line average roughness Ra is 3.0 µm.

Figure 12A:
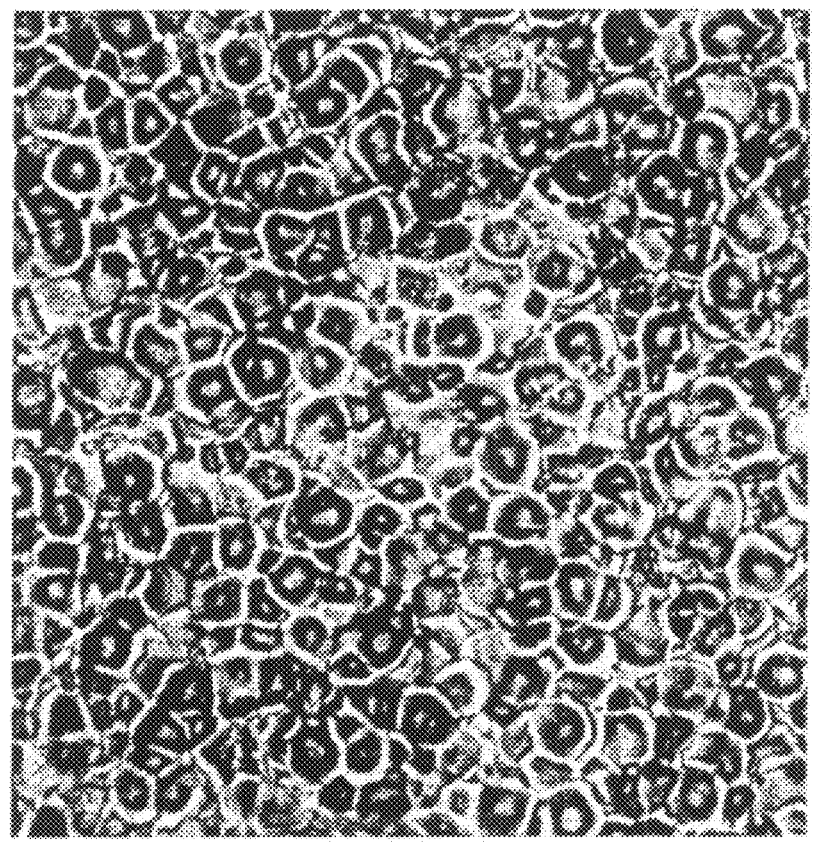
FIG. 12A is a photographed image of an irregular-shaped region of a forging mold manufactured in Example 1.

An image photographing the irregular-shaped region 24A of the manufactured casting mold 20 at magnification 100 using a metal microscope is shown in FIG. 12A.

Then, in a pouring step, after a second mold 26 is overlaid on the casting mold 20 having the irregular-shaped region 24A such that the concave part 24 of the casting mold 20 and a communicating hole 49 as a concave part of a second mold 26 face each other, the casting mold 20 and the second mold 26 are clamped.

As this second mold 26, a mold which is composed of the same material as that of the casting mold 20, and is processed so that a cavity 37 may be formed by clamping with the casting mold 20, is used.

As a material represented by the formula (6) $(Zr, Hf)_a M5_b M6_c$, a molten metal is prepared by melting an alloy having a composition of the formula $Zr_{50}Hf_{10}Cu_{30}Al_{10}$ at 1100° C.

The above-prepared molten metal is poured into a cavity 37 formed by the clamped casting mold 20 and second mold 26 under vacuum condition at $10^{-1}$ to $10^{-2}$ torr.

After this molten metal is hardened, the casting mold 20 and the second mold 26 are opened while a plunger 39 is moved. Thereby, an amorphous alloy member (40 mm×20 mm, thickness 1 mm) composed of a molten metal which has been hardened by cooling, that is, an amorphous (glass) alloy, and on which the irregular-shaped region 24A has been transferred to form an irregular region, is manufactured.

Figure 12B:
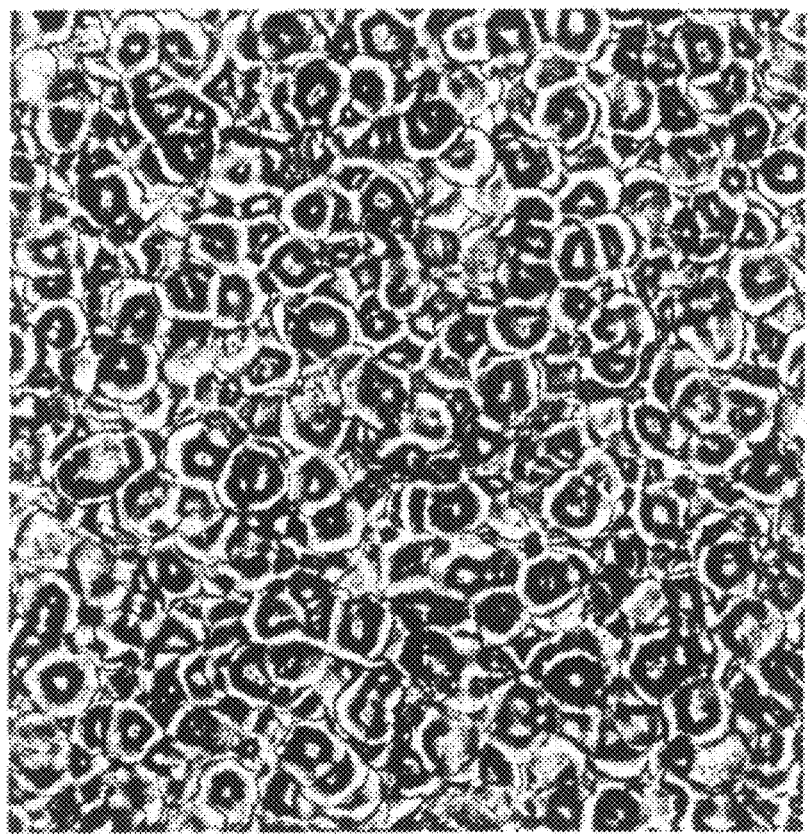
FIG. 12B is a photographed image of an irregular region of an amorphous alloy member manufactured in Example 1.

An image photographing the irregular region of the manufactured amorphous alloy member at magnification 100 using a metal microscope is shown in FIG. 12B.

As shown in FIG. 12A and FIG. 12B, it is seen that in the irregular-shaped region formed on the casting mold 20 (see FIG. 12A), and the irregular region of the manufactured amorphous alloy member (see FIG. 12B), a pattern represented by an irregular shape is mirror image-reversed. For this reason, it may be said that an irregular-shaped region of the casting mold 20 is transferred onto the surface of an amorphous alloy member at a better precision.

Figure 13:
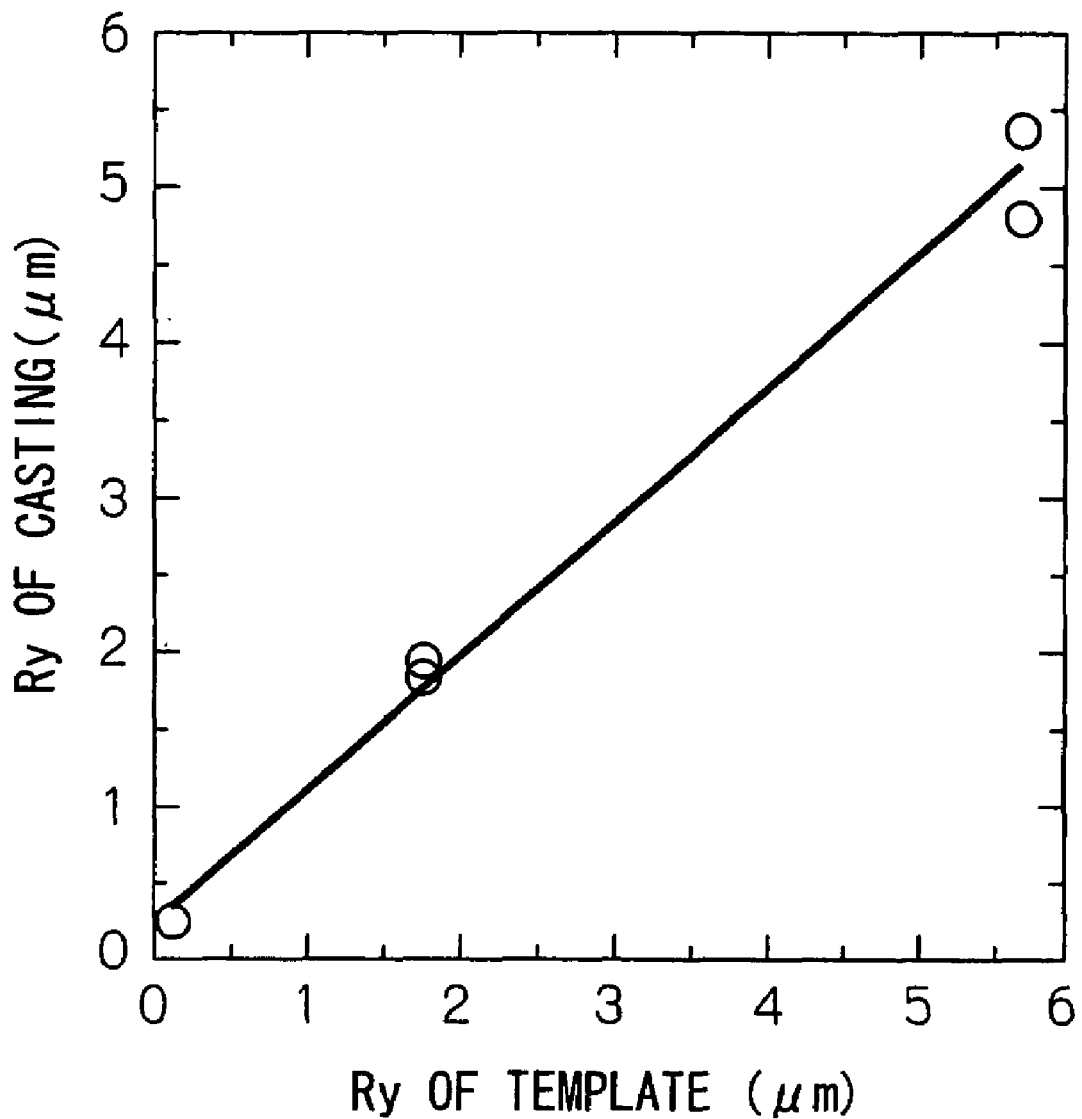
FIG. 13 is a diagram showing a relationship between a surface roughness Ry of an irregular-shaped region of a mold forging manufactured in Example 1, and a surface roughness Ry of an irregular region of an amorphous alloy member.

Regarding an irregular-shaped region of the manufactured casting mold 20, and an irregular region of an amorphous alloy member manufactured using this casting mold 20, surface roughnesses Ry of regions which have been contacted with each other at transference are measured, and results shown in FIG. 13 are obtained.

As shown in FIG. 13, since surface roughnesses Ry of regions of an irregular-shaped region of the above-manufactured casting mold 20, and an irregular region of an amorphous alloy member manufactured using this casting mold 20, which have been contacted at transference are approximately the same values, it may be said that an irregular-shaped region of the casting mold 20 is transferred onto an amorphous alloy member at a better precision up to a submicron order.

A surface roughness Ry is a value representing a maximum height defined as a difference in a maximum and a minimum of a roughness curve, and is measured using a stylus-type membrane thickness-meter (trade name: ET-30, manufactured by Kosaka Laboratory Ltd.).

A volume ratio of an amorphous phase of the manufactured amorphous alloy member is measured by an area ratio of a X-ray diffraction profile between a crystalline phase and an amorphous phase, and is found to be 100%.

Further, a plurality of amorphous alloy members are manufactured using the manufacturing method of Example 1, to manufacture 10,000 amorphous alloy members.

Of 10,000 amorphous alloy members manufactured in Example 1, arbitrary 71 amorphous alloy members are selected. Of the selected 71 amorphous alloy members, one is selected as an amorphous alloy member which is an authenticity determination reference (i.e. amorphous alloy member for taking reference characteristic information), and reference characteristic information is registered by executing processing routine shown in FIG. 8 in the control part 82 using the authenticity determination device 10.

Figure 15:
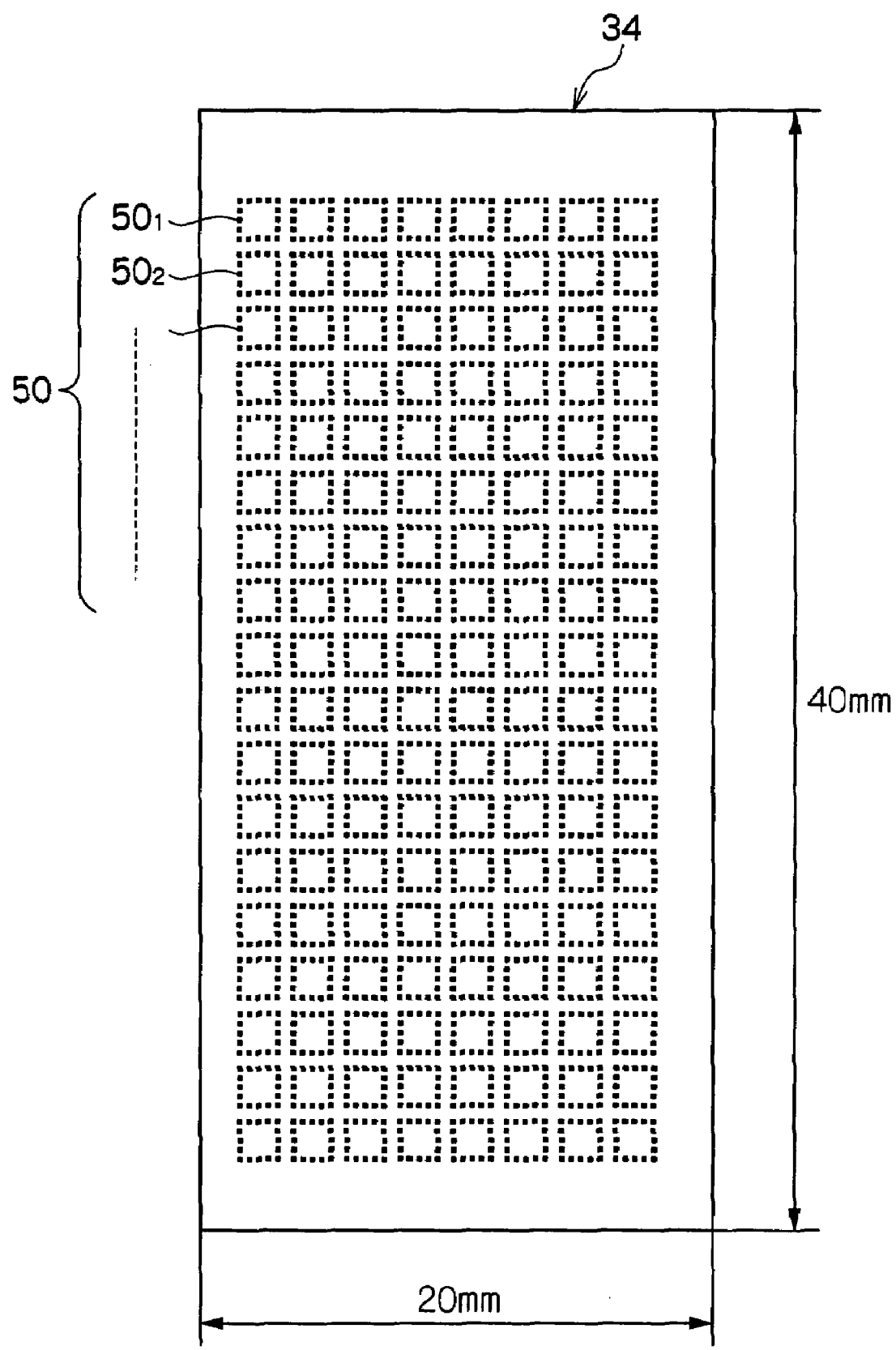
FIG. 15 is a schematic view of a photographed image showing a surface of an amorphous alloy member manufactured in Example 1.

More particularly, as shown in FIG. 15, for one amorphous alloy member for taking reference characteristic information selected for taking the reference characteristic information, 144 reference regions (32×32 dot) (in FIG. 15, reference region 50 ($50_1$ to $50_n$)) are set on a whole surface at an equal interval. In FIG. 15, 34 indicates an amorphous alloy member. Each of this set reference region is read out using the authenticity determination device 10, and each shading information indicating shading of each reference region is stored in a memory 86 as reference characteristic information, thereby, reference characteristic information is registered.

Next, of the aforementioned selected 71 amorphous alloy members, each of 70 amorphous alloy members other than one selected as an amorphous alloy member for taking the reference characteristic information is used as an amorphous alloy member of an authenticity determination subject and, regarding each of these amorphous alloy members, a 64×64 dot region containing a region corresponding to each of 144 reference regions on an amorphous alloy member for taking the reference characteristic information is set as a collation region. In this way, 144 collation regions are set.

Further, regarding each of 70 amorphous alloy members of an authenticity determination subject, an authenticity determination test is performed by executing processing routine shown in FIG. 11 in the control part 82 using the authenticity determination device 10.

As this authenticity determination test, an experiment for confirming FRR (:False Rejection Rate (probability that the genuine is erroneously determined to be the fake)), and an experiment for confirming FAR (:False Acceptance Rate (probability that the fake is erroneously determined to the genuine)) are performed.

[Experiment for Confirming FRR]

The number of reference registration information registered in the memory 86 is 144 and, authenticity is determined based on the 144 sets of reference registration information, and each determination subject characteristic information obtained by reading out each of 144 collation regions on each of the 70 amorphous alloy members of an authenticity determination subject.

For this reason, in an experiment for confirming FRR, an authenticity determination test is performed 144 (places)×70 (members)=10080 (times), that is, 10080 times and, regarding some of them, it is assessed if they are erroneously determined to be the fake.

[Experiment for Confirming FAR]

Of 144 sets of reference registration information registered in the memory 86, arbitrary one is left in the memory 86 as reference registration information, and other 143 reference registration information is deleted from the memory 86.

Thereby, shading information of one reference region of the above-set 144 reference regions on (one) amorphous alloy member for taking the reference characteristic information is registered as reference characteristic information in the memory 86.

That is, one region of 144 regions on an amorphous alloy member for taking reference characteristic information is set as a reference region and, among 144 regions on 70 amorphous alloy members of an authenticity determination subject, 143 places other than a region corresponding to a region set as this reference region are set as a collation region. That is, the 143 places are places which should not be recognized as the "genuine". In addition, the region corresponding to a region set as a reference region indicates a region situated at the same position as that of the reference region when an amorphous alloy member is manufactured using the casting mold 20.

Next, regarding 143 collation regions on 70 amorphous alloy members of the authenticity determination subject, process of determining authenticity is repeated by sequentially changing a region which is selected as a reference region on an amorphous alloy member for taking reference characteristic information (i.e. 144 places).

For this reason, in an experiment for conforming FAR, an authenticity determination test is performed 70 (members)× 143 (places)×144 (places) times, that is, 1441440 times and, regarding some of them, it is assessed if they are erroneously determined to be the genuine.

Authenticity determination is performed under the following conditions.

Reading out resolution with pickup element 32B 600 dpi
Gradation of reading out with reading out part 14: 8 bit gray scale
Size of reference region: 32 dot×32 dot
Size of collation region: 64 dot×64 dot
Threshold of maximum of correlation value: 0.3
Threshold of normalized score of maximum of correlation value: 5
Light source 30B: white LED
Pickup element 32B: CCD Example 2

An amorphous alloy member on which an irregular region is formed is manufactured according to the same manner as that of Example 1 except that, as an amorphous alloy constituting an amorphous alloy member, a molten metal is prepared by melting an alloy having a composition of $Fe_{44}Ni_{28}Si_4B_{20}Nb_4$ as an alloy having a composition of the formula (1) $M_{100-n}TM_n$ at 1400° C. in Example 1, and an authenticity determination test is performed as in Example 1.

A volume ratio of an amorphous phase of the amorphous alloy member manufactured in Example 2 is measured by an area ratio of an X-ray diffraction profile between a crystalline phase and an amorphous phase using an X-ray diffraction apparatus, and is found to be 100%.

Example 3

An amorphous alloy member on which an irregular region is formed is manufactured according to the same manner as that of Example 1 except that, as an amorphous alloy constituting an amorphous alloy member, a molten metal is prepared by melting an alloy having a composition of $Cu_{60}Ti_{10}Zr_{30}$ as an alloy having a composition of the formula (2) $Cu_pTi_qM1_{100-p-q}$ at 1200° C. in Example 1, and an authenticity determination test is performed as in Example 1.

A volume ratio of an amorphous phase of the amorphous alloy member manufactured in Example 3 is measured by an area ratio of an X-ray diffraction profile between a crystalline phase and an amorphous phase using an X-ray diffraction apparatus, and is found to be 100%.

Example 4

An amorphous alloy member on which an irregular region is formed is manufactured, according to the same manner as that of Example 1 except that, as an amorphous alloy constituting an amorphous alloy member, a molten metal is prepared by melting an alloy having a composition of $Ni_{51}Nb_{20}Zr_9Ti_9Co_8Cu_3$ as an alloy having a composition of the formula (3) $Ni_{100-s-t-u}Nb_s(Zr, Hf)_tM2_u$ at 1300° C. in Example 1, and an authenticity determination test is performed as in Example 1.

A volume ratio of an amorphous phase of the amorphous alloy member manufactured in Example 4 is measured by an area ratio of an X-ray diffraction profile between a crystalline phase and an amorphous phase using an X-ray diffraction apparatus, and is found to be 100%.

Example 5

An amorphous alloy member on which an irregular region is formed is manufactured according to the same manner as that of Example 1 except that, as an amorphous alloy constituting an amorphous alloy member, a molten metal is prepared by melting an alloy having a composition of $Fe_{70}B_{20}Nb_6Si_4$ as an alloy having a composition of the formula (4) $Fe_{100-x-y}M3_xM4_y$ at 1400° C. in Example 1, and an authenticity determination test is performed as in Example 1.

A volume ratio of an amorphous phase of the amorphous alloy member manufactured in Example 5 is measured by an area ratio of an X-ray diffraction profile between a crystalline phase and an amorphous phase using an X-ray diffraction apparatus, and is found to be 100%.

Example 6

An amorphous alloy member on which an irregular region is formed is manufactured according to the same manner as that of Example 1 except that, as an amorphous alloy constituting an amorphous alloy member, a molten metal is prepared by melting an alloy having a composition of $Fe_{44}Ni_{28}Si_4B_{20}Nb_4$ as an alloy having a composition of the formula (5) $(Fe_{1-z}(Co,Ni)_z)_{100-x-y}M3_xM4_y$ at 1400° C. in Example 1, and an authenticity determination test is performed as in Example 1.

A volume ratio of an amorphous phase of the amorphous alloy member manufactured in Example 6 is measured by an area ratio of an X-ray diffraction profile between a crystalline phase and an amorphous phase using an X-ray diffraction apparatus, and is found to be 100%.

Example 7

An amorphous alloy member on which an irregular region is formed is manufactured according to the same manner as that of Example 1 except that, as an amorphous alloy constituting an amorphous alloy member, a molten metal is prepared by melting an alloy having a composition of $Ti_{50}Cu_{20}Zr_4Ni_{20}Si_4B_2$ as an alloy having a composition of the formula (7) $Ti_{100-i-j-k}Cu_iM7_jM_k$ at 1200° C. in Example 1, and an authenticity determination test is performed as in Example 1.

A volume ratio of an amorphous phase of the amorphous alloy member manufactured in Example 7 is measured by an area ratio of an X-ray diffraction profile between a crystalline phase and an amorphous phase using an X-ray diffraction apparatus, and is found to be 100%.

Example 8

An amorphous alloy member on which an irregular region is formed is manufactured according to the same manner as that of Example 1 except that, as an amorphous alloy constituting an amorphous alloy member, a molten metal is prepared by melting an alloy having a composition of $Zr_{65}Pd_{10}Cu_{10}Al_{15}$ as an alloy having a composition of the formula (8) $M^1_aM^2_bLn_cM^3_dM^4_eM^5_f$ at 1200° C. in Example 1, and an authenticity determination test is performed as in Example 1.

A volume ratio of an amorphous phase of the amorphous alloy member manufactured in Example 8 is measured by an area ratio of an X-ray diffraction profile between a crystalline phase and an amorphous phase using an X-ray diffraction apparatus, and is found to be 100%.

Example 9

An amorphous alloy member on which an irregular region is formed is manufactured, according to the same manner as that of Example 1 except that, as an amorphous alloy constituting an amorphous alloy member, a molten metal is prepared by melting an alloy having a composition of $Al_{20}La_{65}Cu_{7.5}Ni_{3.8}CO_{3.7}$ as an alloy having a composition of formula (9) $Al_{100-g-h-i}Ln_gM^6_hM^3_i$ at 700° C. in Example 1, and an authenticity determination test is performed as in Example 1.

A volume ratio of an amorphous phase of the amorphous alloy member manufactured in Example 9 is measured by an area ratio of an X-ray diffraction profile between a crystalline phase and an amorphous phase using an X-ray diffraction apparatus, and is found to be 100%.

Example 10

An amorphous alloy member on which an irregular region is formed is manufactured, according to the same manner as that of Example 1 except that, as an amorphous alloy constituting an amorphous alloy member, a molten metal is prepared by melting an alloy having a composition of $Mg_{65}Cu_{25}Y_{10}$ as an alloy having a composition of the formula (12) $Mg_{100-q-s}M^7_qM^9_s$ at 700° C. in Example 1, and an authenticity determination test is performed as in Example 1.

A volume ratio of an amorphous phase of the amorphous alloy member manufactured in Example 10 is measured by an area ratio of an X-ray diffraction profile between a crystalline phase and an amorphous phase using an X-ray diffraction apparatus, and is found to be 100%.

Example 11

An amorphous alloy member on which an irregular region is formed is manufactured according to the same manner as that of Example 1 except that, as an amorphous alloy constituting an amorphous alloy member, a molten metal is prepared by melting an alloy having a composition of $Mg_{65}Y_{10}Cu_{20}Al_5$ as an alloy having a composition of the formula (13) $Mg_{100-q-r-s}M^7{}_qM^8{}_rM^9{}_s$ at 700° C. in Example 1, and an authenticity determination test is performed as in Example 1.

A volume ratio of an amorphous phase of the amorphous alloy member manufactured in Example 11 is measured by an area ratio of an X-ray diffraction profile between a crystalline phase and an amorphous phase using an X-ray diffraction apparatus, and is found to be 100%.

Example 12

An amorphous alloy member on which an irregular region is formed is manufactured according to the same manner as that of Example 1 except that an irregular-shaped region is formed on a casting mold 20 by forming a plurality of dents in a concave part 24 of a casting mold 20 by pushing a quadrangular pyramid-like diamond needle (trade name: MVK-EIII, fine hardness meter manufactured by Akashi Machinery Works) against a concave part 24 of a casting mold 20, and an authenticity determination test is performed as in Example 1.

Figure 14:
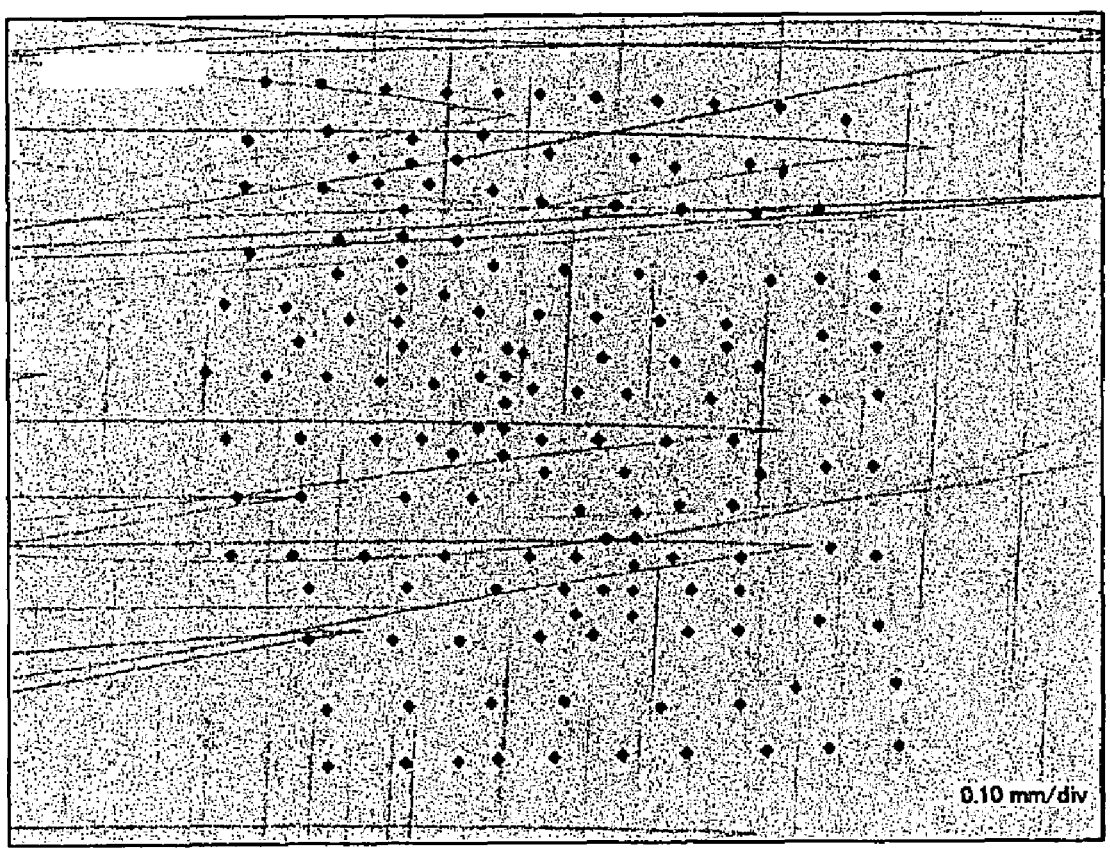
FIG. 14 is a photographed image of an irregular region of an amorphous alloy member manufactured in Example 12.

Each dent formed on this irregular region is a 50 μm×50 μm square, and has a depth of 10 μm. A center line average roughness Ra of this irregular-shaped region 24A is measured, and is found to be Ra=0.2 μm. An image photographing this irregular region at magnification×75 using trade name: Microscope, manufactured by KEYENCE Corporation is shown in FIG. 14.

A volume ratio of an amorphous phase of the amorphous alloy member manufactured in Example 12 is measured by an area ratio of an X-ray diffraction profile between a crystalline phase and an amorphous phase using an X-ray diffraction apparatus, and is found to be 100%.

Example 13

An amorphous alloy member is manufactured according to the same manner as that of Example 1 except that the following casting mold is used, and an authenticity determination test is performed as in Example 1.
Manufacturing of Casting Mold As a casting mold, a casting mold 20 having a shape shown in FIG. 2A, composed of a high speed tool steel (SKH51) is prepared.

Next, by discharge-processing a concave part 24 of this casting mold 20, an irregular-shaped region 24A of 20 mm×50 mm is formed. A center line average roughness Ra of this irregular-shaped region 24A is measured, and found to be Ra=0.1 μm.

A volume ratio of an amorphous phase of the amorphous alloy member manufactured in Example 13 is measured by an area ratio of an X-ray diffraction profile between a crystalline phase and an amorphous phase using an X-ray diffraction apparatus, and is found to be 100%.

Example 14

An amorphous alloy substrate is manufactured using a casting mold 20 in which a concave part 24 has been mirror plane-processed (Ra=0.01 μm) in place of the casting mold 20 used in Example 1, and using the molten metal used in Example 8.

Next, as a forging mold, a forging mold 60 composed of a high speed tool steel (SKH51) is prepared. Then, by discharge-processing this forging mold as in Example 1, an irregular-shaped region is formed on the forging mold.

A center line average roughness Ra of this irregular-shaped region 24A is measured, and found to be Ra=1.0 μm.

This forging mold is attached to a forging machine, and plasticity processing of the amorphous alloy substrate is performed under the following forging condition, thereby, an amorphous alloy member on which an irregular region is formed, is formed.
Forging Condition The amorphous alloy substrate is heated to 420° C. and 450° C., respectively, which are not lower than a glass transition temperature (Tg) 410° C. of the amorphous alloy constituting this amorphous alloy substrate, and lower than a crystallization temperature (Tx) 490° C. of this amorphous alloy.

Pressure from the casting mold 20 to the amorphous alloy substrate: 10 MPa

Pressure applying time: within 15 minutes and 2 minutes, respectively, for heating temperature of 420° C. and 450° C.

Regarding the manufactured amorphous alloy member, an authenticity determination test is performed as in Example 1.

A volume ratio of an amorphous phase of the amorphous alloy member manufactured in Example 14 is measured by an area ratio of an X-ray diffraction profile between a crystalline phase and an amorphous phase using an X-ray diffraction apparatus, and is found to be 100%.

Comparative Example 1

An amorphous alloy member on which an irregular region is formed is manufactured according to the same manner as that of Example 1 except that, as a material constituting an amorphous alloy member, a molten metal is prepared by melting, at 700° C., a casting aluminum alloy ADC12 in place of the amorphous alloy in Example 1, and an authenticity determination test is performed as in Example 1.

A threshold of a maximum of a correlation value, and a threshold of a normalized score of a maximum of a correlation value are the same as those in Example 1.

In an authenticity determination test in an experiment for confirming the FRR in Example 1 to Example 14, in 10080 time authenticity determination tests, assessment results indicating that all are the "genuine" is displayed in the displaying part 19, and erroneous determination indicating the "fake" is not displayed. Accordingly, FRR is 0%.

On the other hand, when an amorphous alloy is not used as a material included in an amorphous alloy member (Comparative Example 1), in 10080 time authenticity determination tests, the displaying part 19 displays that assessment result indicating the "genuine" is 8568 times, and an erroneous determination display indicating the "fake" is 1512 times. Accordingly, FRR is 15%.

In an authenticity determination test in an experiment for confirming the FAR in Example 1 to Example 14, in 1441440 time authenticity determination tests, assessment results indicating that all are the "fake" is displayed. Accordingly, FAR is 0%.

On the other hand, when an amorphous alloy is not used as a material included in an amorphous alloy member (Comparative Example 1), in 1441440 time authenticity determination tests, the displaying part 19 displays assessment result indicating the "fake" 1138738 times, and erroneous determination indicating the "genuine" is displayed 302702 times. For this reason, FAR is 21%.

The foregoing description of the embodiments of an aspect of the invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practice applications, thereby enabling others skilled in the art to understand invention for various embodiments and with the various modifications as are suited to the particular use contemplated. It is intended that the scope of the invention be defined by the following claims and their equivalents.

What is claimed is:

1. An authenticity determination method, comprising:

manufacturing a plurality of amorphous alloy members using a same mold, the plurality of amorphous alloy members including a first amorphous alloy member and a second amorphous alloy member, storing in advance reference characteristic information representing a characteristic of a first irregular region of the first amorphous alloy member that is an authenticity determining reference, the first amorphous alloy member comprising the first irregular region on a surface, the first irregular region having a center line average roughness Ra of about 0.1 μm to about 1000 μm, and the first irregular region comprising an amorphous alloy having an amorphous phase at a volume ratio of about 50% to about 100%;

reading out determination subject characteristic information representing a characteristic of a second irregular region of the second amorphous alloy member that is an authenticity determining subject, the second amorphous alloy member comprising the second irregular region on a surface, the second irregular region having a center line average roughness Ra of about 0.1 μm to about 1000 μm, and the second irregular region comprising an amorphous alloy having an amorphous phase at a volume ratio of about 50% to about 100%; and comparing the determination subject characteristic information and the reference characteristic information when the determination subject characteristic information is read out, and determining whether the second amorphous alloy member that is the authenticity determination subject is authentic or not based on the comparison result.

2. The authenticity determination method of claim 1, wherein the center line average roughness Ra of the irregular region of the first and/or the second amorphous alloy member is about 0.1 μm to about 100 μm.

3. The authenticity determination method of claim 1, wherein the first and/or the second amorphous alloy is at least one selected from the group consisting of a Zr-based amorphous alloy, a Hf-based amorphous alloy, a Fe-based amorphous alloy, a Co-based amorphous alloy, a Ni-based amorphous alloy, a Ti-based amorphous alloy, a Cu-based amorphous alloy, an Au-based amorphous alloy, and a La-based amorphous alloy.

4. The authenticity determination method of claim 1, wherein the first and/or the second amorphous alloy comprises at least one composition represented by any one of the following formulae (1) to (7)

$$M_{100-n}TM_n \quad \text{Formula (1)}$$

wherein in formula (1): M represents one or more elements selected from the group consisting of Fe, Co, Ni, Cu, Ti, Zr and Hf; TM comprises about 1 atomic % or more of at least one element selected from the group consisting of Cr, Mo, Nb, Al, Sn and B, and a remainder that represents at least one element selected from the group consisting of transition metal elements belonging to Group 3, transition metal elements belonging to Group 4, transition metal elements belonging to Group 5, transition metal elements belonging to Group 6, transition metal elements belonging to Group 8, transition metal elements belonging to Group 9, transition metal elements belonging to Group 10, transition metal elements belonging to Group 11, typical elements belonging to Group 13, typical elements belonging to Group 14 and typical elements belonging to Group 15, but excluding Cr, Mo, Nb, the elements applied in M, Al, Sn and B; n represents atomic %; and the relationship $5 \leq n \leq 50$ is satisfied;

$$Cu_pTi_qM1_{100-p-q} \quad \text{Formula (2)}$$

wherein in formula (2): M1 represents at least one element selected from the group consisting of elements belonging to the iron group, elements belonging to the platinum group, elements belonging to noble metals, Al, Sn, Zn, Hf and Zr; p and q each represent atomic %, and the relationships $50 \leq p \leq 65$ and $2 \leq q \leq 20$ are satisfied;

$$Ni_{100-s-t-u}Nb_s(Zr,Hf)_tM2_u \quad \text{Formula (3)}$$

wherein in formula (3): M2 represents at least one element selected from the group consisting of elements belonging to the iron group, elements belonging to the platinum group, elements belonging to noble metals, Cu, and Ti; and, s, t and u each represent atomic %, and the relationships $10 \leq s \leq 25$, $5 \leq t \leq 20$, $5 \leq u \leq 25$ and $10 \leq t+u \leq 35$ are satisfied;

$$Fe_{100-x-y}M3_xM4_y \quad \text{Formula (4)}$$

wherein in formula (4): M3 represents at least one element selected from the group consisting of transition metal elements belonging to Group 3, transition metal elements belonging to Group 4, transition metal elements belonging to Group 5 and transition metal elements belonging to Group 6; M4 consists of one or more elements selected from the group consisting of Mn, Ru, Rh, Pd, Ga, Al, Ge, Si, B and C; x and y each represent atomic %, and the relationships $2 \leq x \leq 35$ and $5 \leq y \leq 30$ are satisfied;

$$(Fe_{1-z}(Co,Ni)_z)_{100-x-y}M3_xM4_y \quad \text{Formula (5)}$$

wherein in formula (5): M3 represents at least one element selected from the group consisting of transition metal elements belonging to Group 3, transition metal elements belonging to Group 4, transition metal elements belonging to Group 5 and transition metal elements belonging to Group 6; M4 consists of one or more elements selected from the group consisting of Mn, Ru, Rh, Pd, Ga, Al, Ge, Si, B and C; x, y and z each represent atomic %, and the relationships $2 \leq x \leq 35$, $5 \leq y \leq 30$ and $0.1 \leq z \leq 0.7$ are satisfied;

$$(Zr,Hf)_aM5_bM6_c \quad \text{Formula (6)}$$

wherein in formula (6): M5 represents at least one element selected from the group consisting of elements belonging to Group 3, elements belonging to Group 5, elements belonging to Group 6, elements belonging to the iron group, elements belonging to the platinum group, elements belonging to noble metals, Cu, Ti and Mn; M6 represents at least one element selected from the group consisting of Be, Zn, Al, Ga, B, C and N; a, b, and c each represent atomic %, and the relationships $30 \leq a \leq 70$, $15 \leq b \leq 65$ and $1 \leq c \leq 30$ are satisfied; and $$Ti_{100-i-j-k}Cu_i M7_j M8_k \qquad \text{Formula (7)}$$

wherein in formula (7): M7 represents at least one transition metal element selected from the group consisting of Zr, Hf, elements belonging to the iron group, and elements belonging to the platinum group; M8 represents at least one element selected from the group consisting of elements belonging to Group 3, elements belonging to Group 5, elements belonging to Group 6, Al, Sn, Ge, Si, B, and Be; i, j and k each represent atomic %; and the relationships $5 \leq i \leq 35$, $10 \leq j \leq 35$ and $1 \leq k \leq 20$ are satisfied.

5. The authenticity determination method of claim 1, wherein the first and/or the second amorphous alloy comprises at least one composition represented by any one of the following formulae (8) to (13):

$$M^1_a M^2_b Ln_c M^3_d M^4_e M^5_f \qquad \text{Formula (8)}$$

wherein in formula (8): $M^1$ represents one or two elements selected from the group consisting of Zr and Hf; M2 represents $M^2$ represents at least one element selected from the group consisting of Ni, Cu, Fe, Co, Mn, Nb, Ti, V, Cr, Zn, Al and Ga; Ln represents at least one element selected from the group consisting of Y, La, Ce, Nd, Sm, Gd, Tb, Dy, Ho, Yb and Mm (mischmetal which is a mixture of rare earth elements); $M^3$ represents at least one element selected from the group consisting of Be, B, C, N and O; $M^4$ represents at least one element selected from the group consisting of Ta, W and Mo; and $M^5$ represents at least one element selected from the group consisting of Au, Pt, Pd and Ag; a, b, c, d, e and f each represent atomic %, and the relationships $25 \leq a \leq 85$, $15 \leq b \leq 75$, $0 \leq c \leq 30$, $0 \leq d \leq 30$, $0 \leq e \leq 15$ and $0 \leq f \leq 15$ are satisfied;

$$Al_{100-g-h-i}Ln_g M^6_h M^6_h M^3_i \qquad \text{Formula (9)}$$

wherein in formula (9): Ln represents at least one element selected from Y, La, Ce, Nd, Sm, Gd, Tb, Dy, Ho, Yb and Mm; $M^6$ represents at least one element selected from the group consisting of Ti, V, Cr, Mn, Fe, Co, Ni, Cu, Zr, Nb, Mo, Hf, Ta and W; $M^3$ represents at least one element selected from the group consisting of Be, B, C, N and O; g, h, and i each represent atomic %, and the relationships $30 \leq g \leq 90$, $0 \leq h \leq 55$ and $0 \leq i \leq 10$ are satisfied;

$$Mg_{100-p}M^7_p \qquad \text{Formula (10)}$$

wherein in formula (10): $M^7$ represents at least one element selected from the group consisting of Cu, Ni, Sn, and Zn; p represents atomic %, and the relationship $5 \leq p \leq 60$ is satisfied;

$$Mg_{100-q-r}M^7_q M^8_r \qquad \text{Formula (11)}$$

wherein in formula (11): $M^7$ represents at least one element selected from the group consisting of Cu, Ni, Sn and Zn; and $M^8$ represents at least one element selected from the group consisting of Al, Si and Ca; q and r each represent atomic %, and the relationships $1 \leq q \leq 35$ and $1 \leq r \leq 25$ are satisfied;

$$Mg_{100-q-s}M^7_q M^9_s \qquad \text{Formula (12)}$$

wherein in formula (12); $M^7$ represents at least one element selected from the group consisting of Cu, Ni, Sn and Zn; $M^9$ represents at least one element selected from the group consisting of Y, La, Ce, Nd, Sm and Mm; q and s each represent atomic %; and the relationships $1 \leq q \leq 35$ and $3 \leq s \leq 25$ are satisfied; and $$Mg_{100-q-r-s}M^7_q M^8_r M^9_s \qquad \text{Formula (13)}$$

wherein in formula (13): $M^7$ represents at least one element selected from the group consisting of Cu, Ni, Sn and Zn; $M^8$ represents at least one element selected from the group consisting of Al, Si and Ca; $M^9$ represents at least one element selected from the group consisting of Y, La, Ce, Nd, Sm and Mn; q, r and s each represent atomic %, and the relationships $1 \leq q \leq 35$, $1 \leq r \leq 25$ and $3 \leq s \leq 25$ are satisfied.

6. The authenticity determination method of claim 1, using an authenticity determination device,
the authenticity determination device, comprising:
a memory unit that stores in advance reference characteristic information representing a characteristic of a first irregular region of a first amorphous alloy member that is an authenticity determining reference, the first amorphous alloy member comprising the first irregular region on a surface, the first irregular region having a center line average roughness Ra of about 0.1 μm to about 1000 μm, and the first irregular region comprising an amorphous alloy having an amorphous phase at a volume ratio of about 50% to about 100%;
a reading out unit that reads out determination subject characteristic information representing a characteristic of a second irregular region of a second amorphous alloy member that is an authenticity determining subject, the second amorphous alloy member comprising the second irregular region on a surface, the second irregular region having a center line average roughness Ra of about 0.1 μm to about 1000 μm, and the second irregular region comprising an amorphous alloy having an amorphous phase at a volume ratio of about 50% to about 100%; and
a determination unit that, when the determination subject characteristic information is read out, compares the determination subject characteristic information and the reference characteristic information, and determines whether the second amorphous alloy member that is the authenticity determination subject is authentic or not based on the comparison result.

7. The authenticity determination method of claim 1, wherein the first and/or the second amorphous alloy member is manufactured by a process comprising:
pouring a molten metal that is capable of manufacturing an amorphous alloy comprising at least an amorphous phase at a volume ratio of about 50% to about 100%, into a casting mold having an irregular-shaped region having a center line average roughness Ra of about 0.1 μm to about 1000 μm on a surface, so that the molten metal comes into contact with at least the irregular-shaped region,
hardening the molten metal poured into the casting mold, and
separating the hardened molten metal from the casting mold.

8. The authenticity determination method of claim 7, wherein the first and/or the second amorphous alloy member is manufactured by a process that further comprises forming a ceramic-based hardened film on the surface of the first and/or the second amorphous alloy member.

9. The authenticity determination method of claim 8, wherein the ceramic-based hardened film is a zirconia film.

10. The authenticity determination method of claim 1, wherein the first and/or the second amorphous alloy member is manufactured by a process comprising:

disposing a forging mold having an irregular-shaped region that has been formed on the surface of the forging mold and has a center line average roughness Ra of about 0.1 μm to about 1000 μm, and an amorphous alloy substrate having a region that comprises an amorphous alloy having at least an amorphous phase at a volume ratio of about 50% to about 100% and having a center line average roughness Ra of about 0.1 μm or less, such that the irregular shaped region and the region comprising the amorphous alloy face each other; and applying pressure to the amorphous alloy substrate to plastic-deform at least a part of the amorphous alloy substrate.

* * * * *